(12) United States Patent
Jungbluth et al.

(10) Patent No.: US 10,948,390 B2
(45) Date of Patent: Mar. 16, 2021

(54) TISSUE ARRAY USING A CARRIER MEDIUM AND METHOD FOR PROVIDING THE SAME

(71) Applicant: Memorial Sloan-Kettering Cancer Center, New York, NY (US)

(72) Inventors: Achim Jungbluth, New York, NY (US); Denise Frosina, Bay Terrace, NY (US)

(73) Assignee: Memorial Sloan-Kettering Cancer Center, New York, NY (US)

( * ) Notice: Subject to any disclaimer, the term of this patent is extended or adjusted under 35 U.S.C. 154(b) by 675 days.

(21) Appl. No.: 15/502,059

(22) PCT Filed: Aug. 7, 2015

(86) PCT No.: PCT/US2015/044160
§ 371 (c)(1),
(2) Date: Feb. 6, 2017

(87) PCT Pub. No.: WO2016/022891
PCT Pub. Date: Feb. 11, 2016

(65) Prior Publication Data
US 2017/0234779 A1    Aug. 17, 2017

Related U.S. Application Data

(60) Provisional application No. 62/034,235, filed on Aug. 7, 2014.

(51) Int. Cl.
*G01N 1/36* (2006.01)
*G01N 1/44* (2006.01)
*G01N 1/28* (2006.01)

(52) U.S. Cl.
CPC ............... *G01N 1/36* (2013.01); *G01N 1/44* (2013.01); *G01N 2001/2873* (2013.01); *G01N 2001/368* (2013.01)

(58) Field of Classification Search
CPC ....... G01N 1/36; G01N 2001/368; G01N 1/44
See application file for complete search history.

(56) References Cited

U.S. PATENT DOCUMENTS

| 6,699,710 | B1 | 3/2004 | Kononen et al. |
| 2002/0137198 | A1 | 9/2002 | Mastorides et al. |
| 2002/0192702 | A1* | 12/2002 | Kononen ............. B01J 19/0046 435/6.14 |
| 2012/0010728 | A1 | 1/2012 | Sun et al. |
| 2014/0135236 | A1 | 5/2014 | Musat |

FOREIGN PATENT DOCUMENTS

WO         03010280 A1    2/2003

OTHER PUBLICATIONS

Extended European Search Report dated Mar. 19, 2018 for European National Phase Application No. 15830230.7.
Packeisen, J. et al., "Demystified . . . Tissue Microarray Technology," J. Clin Pathol: Mol Pathol, Aug. 2003, vol. 56, No. 4; pp. 198-204.
International Search Report for International Patent Application No. PCT/US2015/044160 dated Nov. 6, 2015.
International Written Opinion for International Patent Application No. PCT/US2015/044160 dated Nov. 6, 2015.
Communication pursuant to Article 94(3) EPC dated Jul. 18, 2019 for European national phase application No. 15830230.7.

* cited by examiner

*Primary Examiner* — Robert J Yamasaki
(74) *Attorney, Agent, or Firm* — Hunton Andrews Kurth LLP

(57) ABSTRACT

An exemplary tissue array, and a method for producing the same, can be provided which can include providing an accepter biological structure(s), providing a donor tissue(s), removing a portion(s) of the donor tissue(s), and removing a portion(s) of the accepter biological structure(s). The removed portion(s) of the accepter biological structure(s) can have a size that is substantially similar to a size of the removed portion(s) of the donor tissue(s). The removed portion(s) of the donor tissue(s) can be inserted into the accepter biological structure(s) at a location substantially corresponding to the removed portion(s) of the accepter biological structure(s).

15 Claims, 22 Drawing Sheets

Figure 6
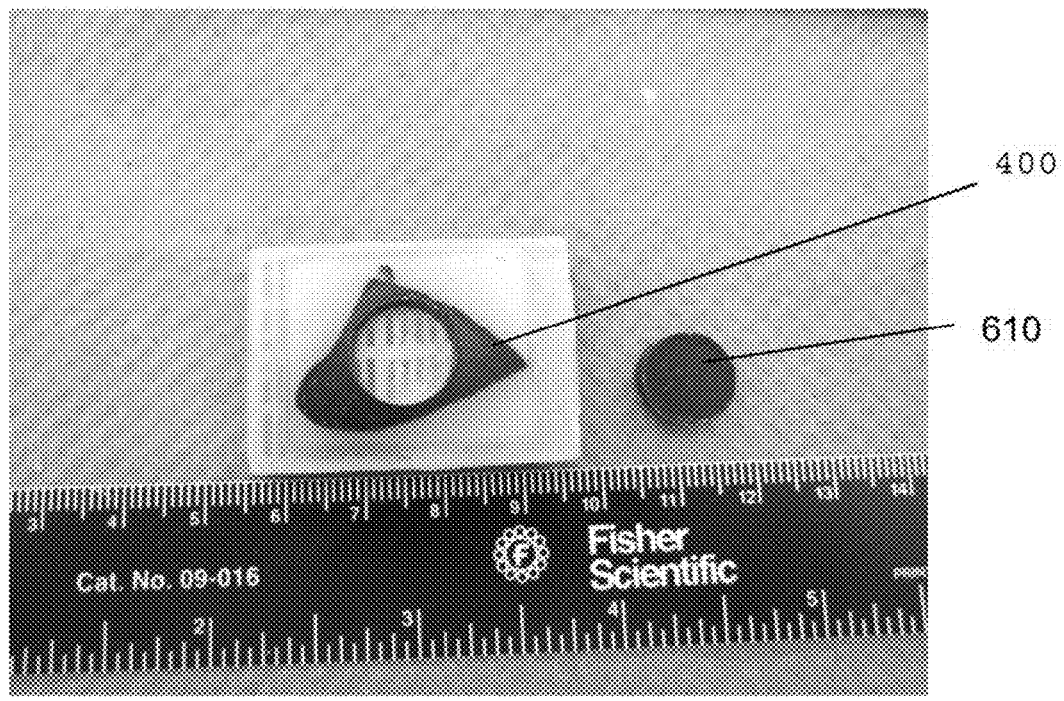
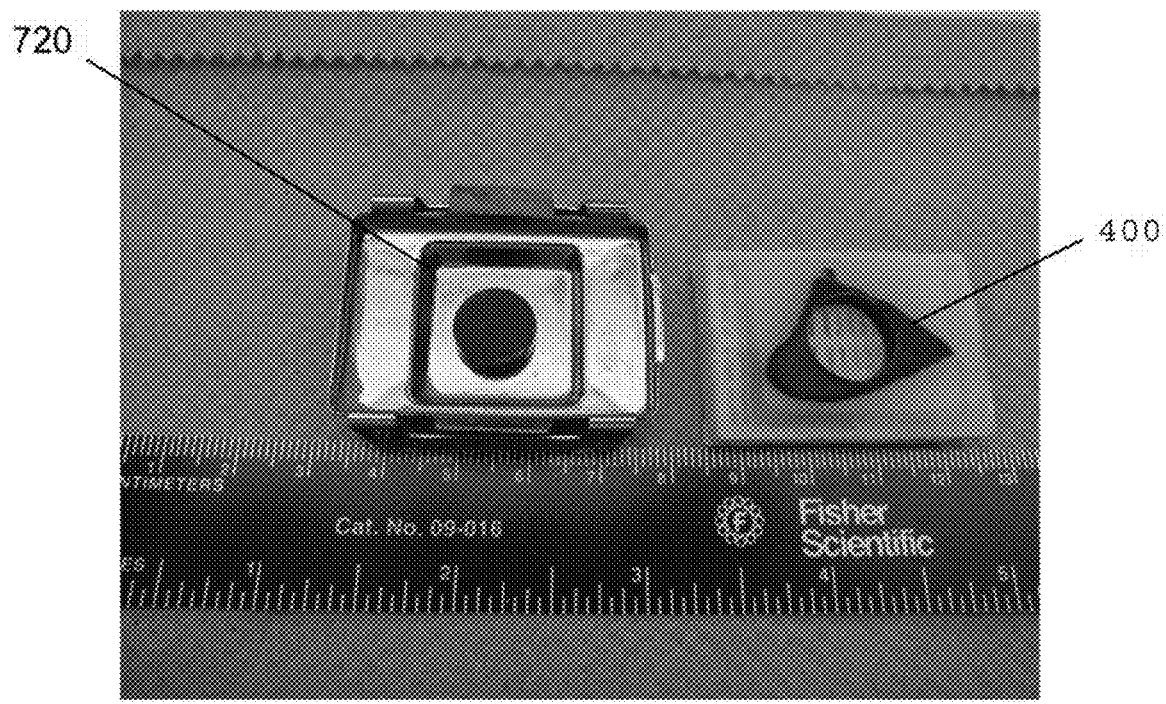
Figure 7

Figure 8
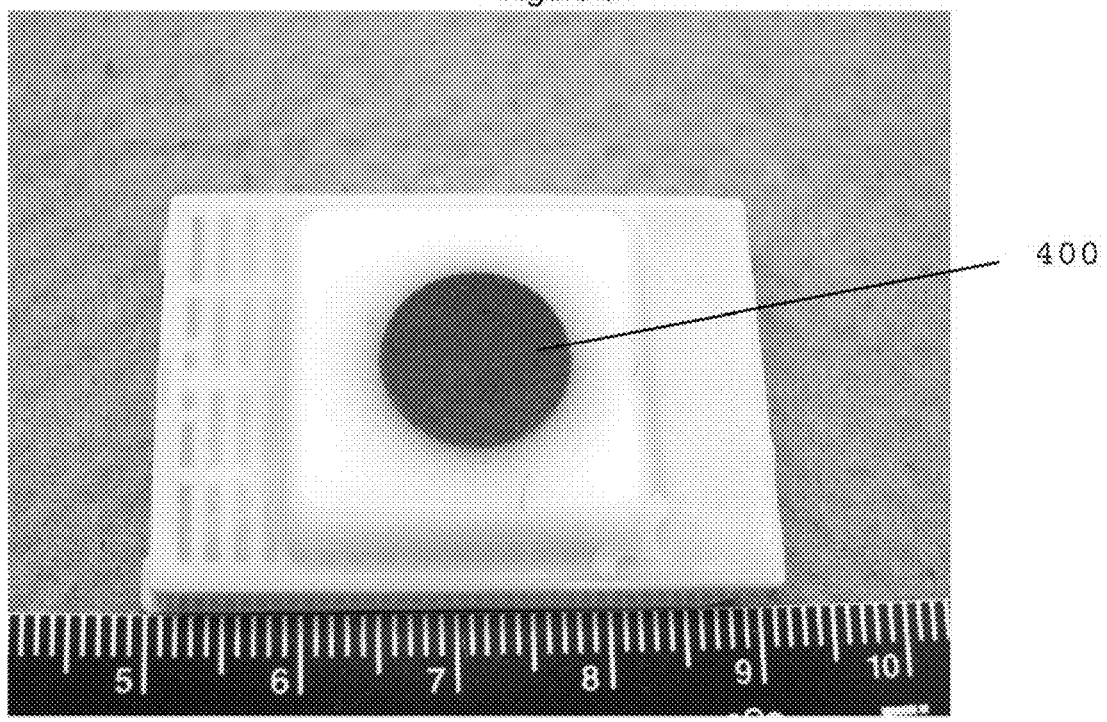
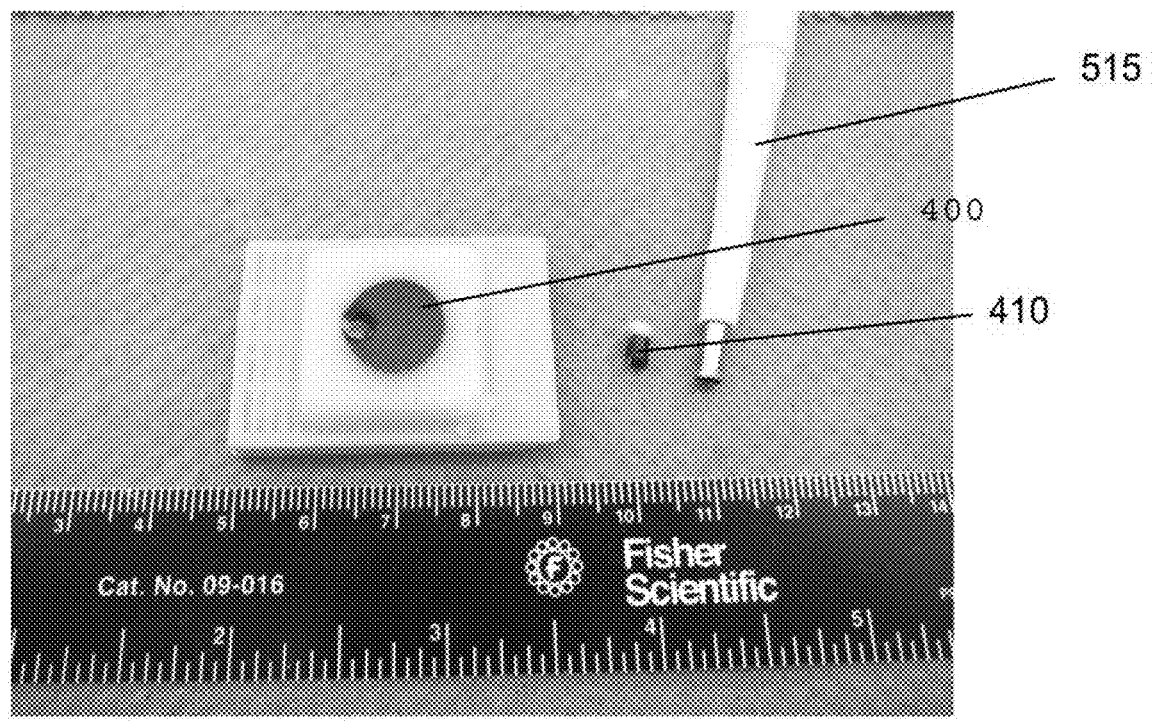
Figure 9

Figure 13
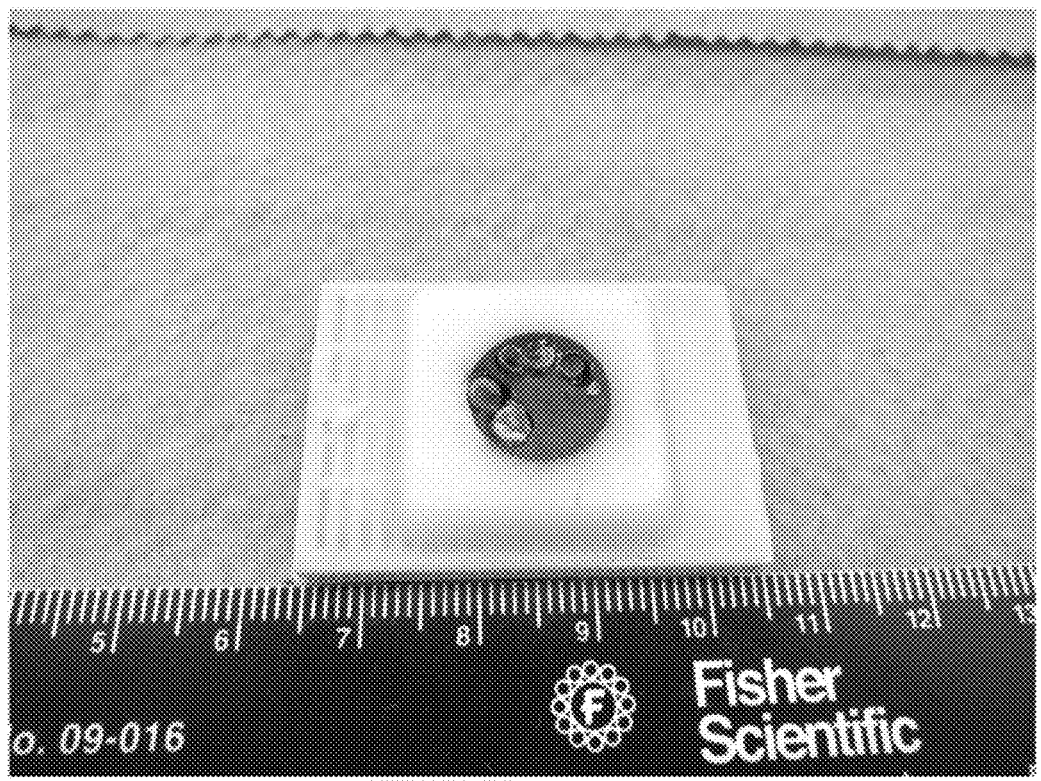
Figure 14

Figure 15
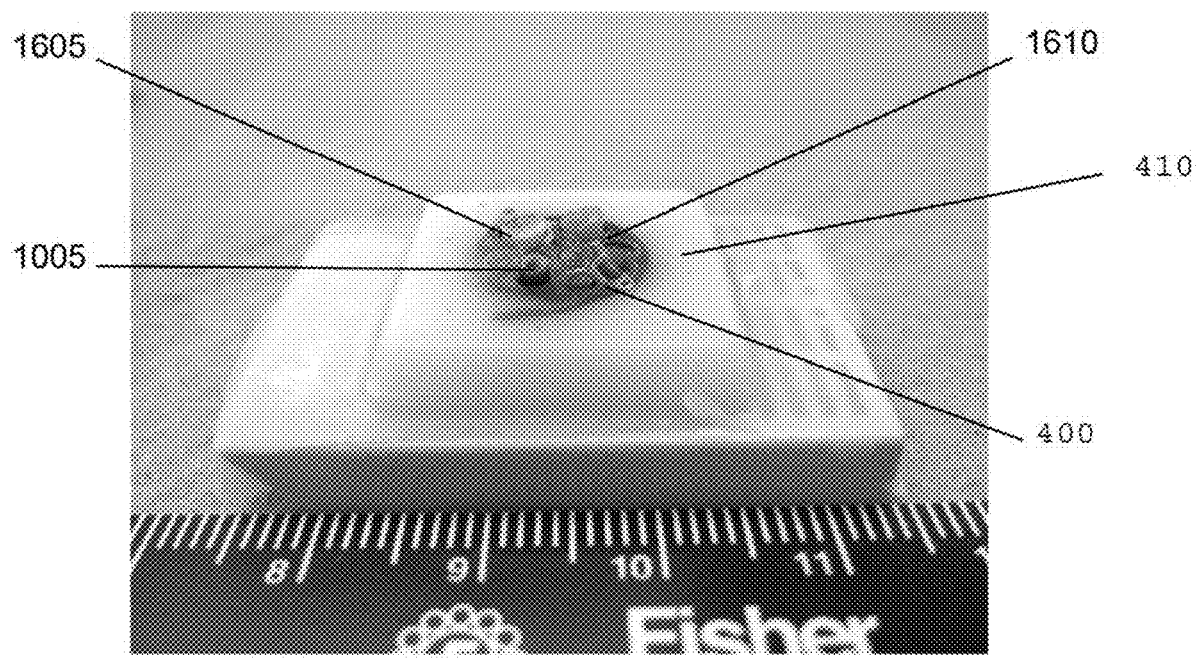
Figure 16

Figure 17
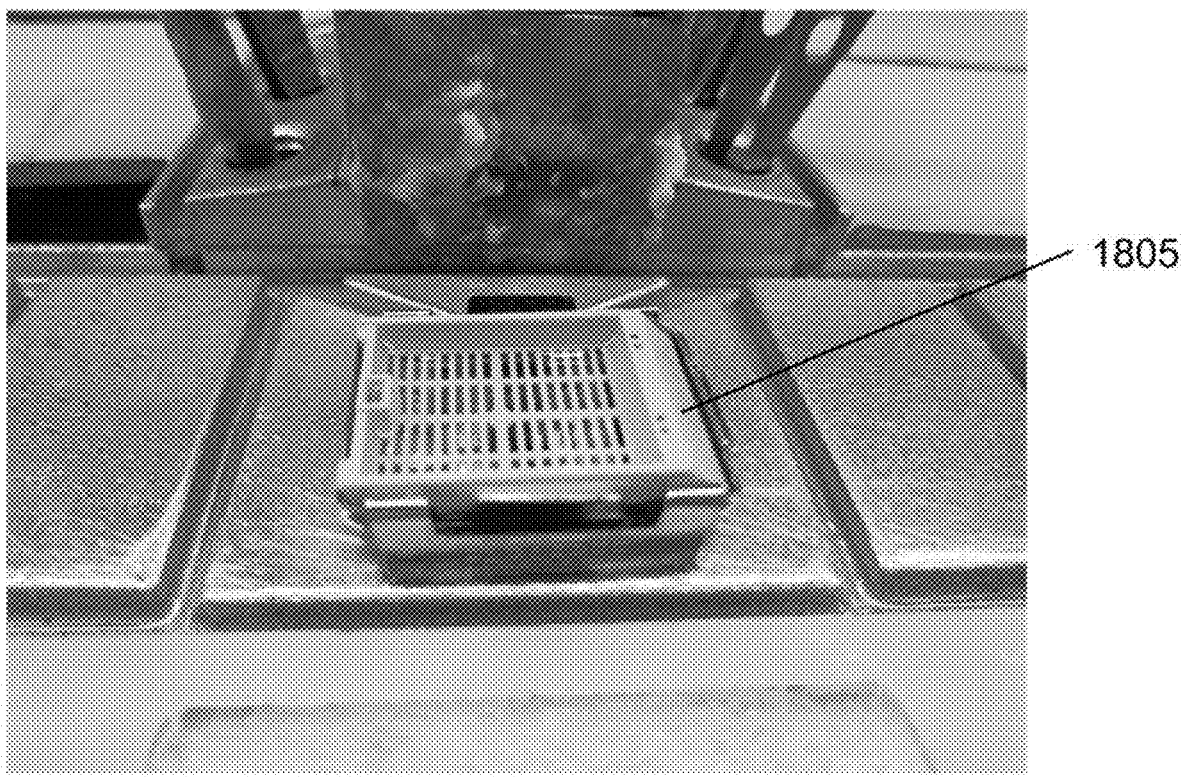
Figure 18

Figure 21
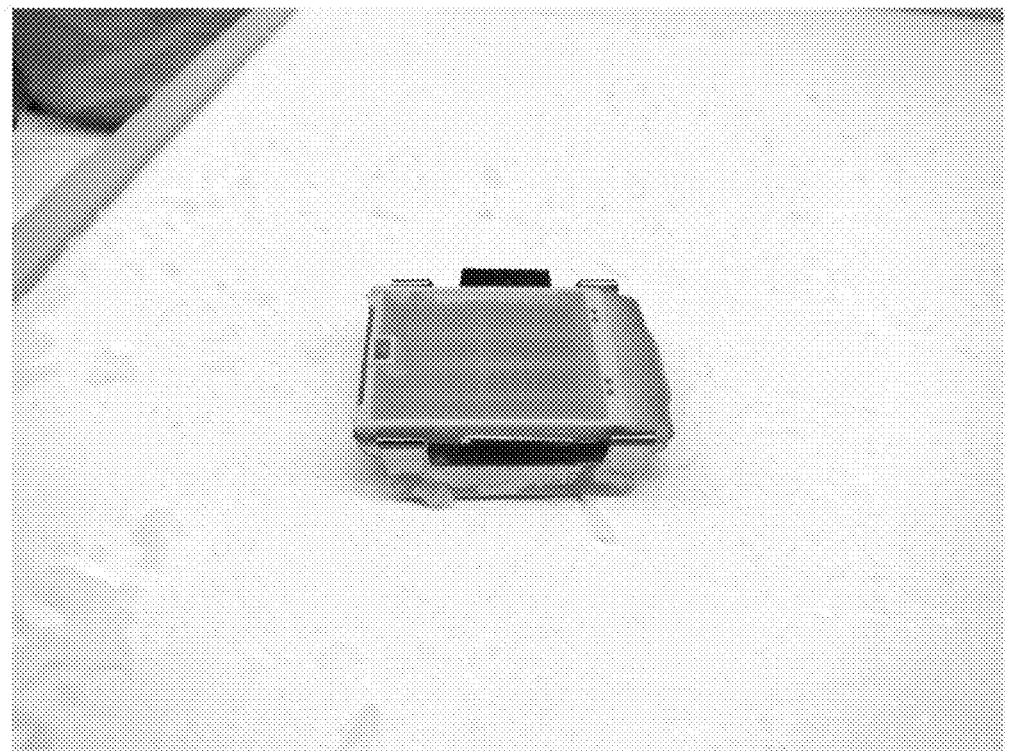
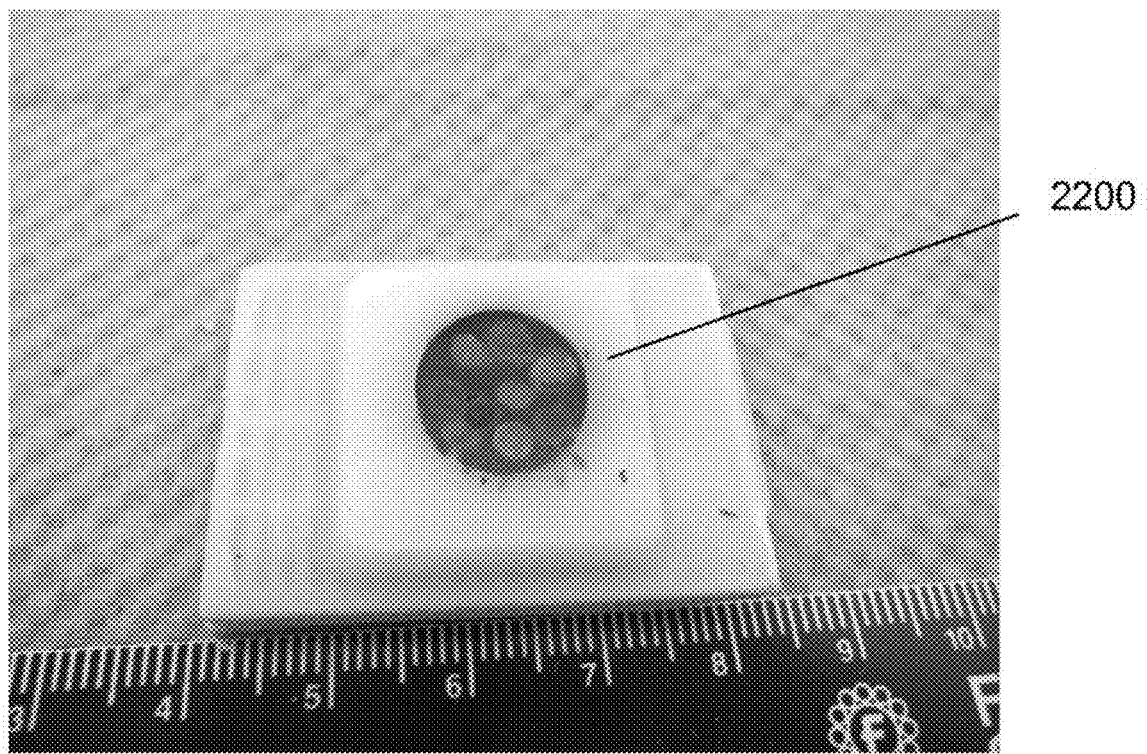
Figure 22

Figure 25
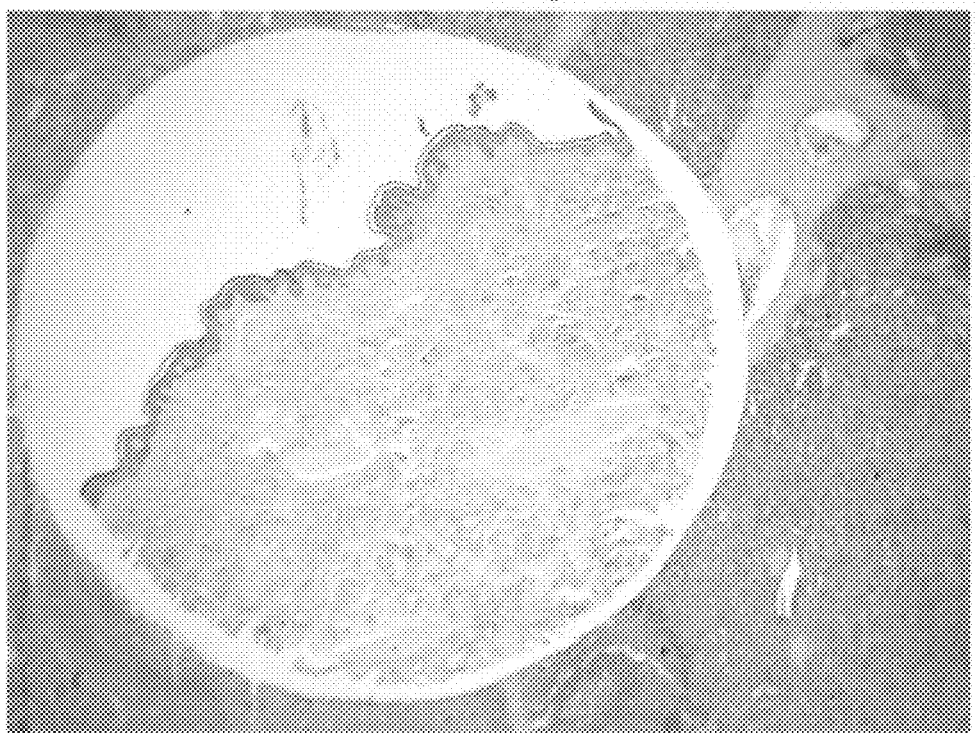
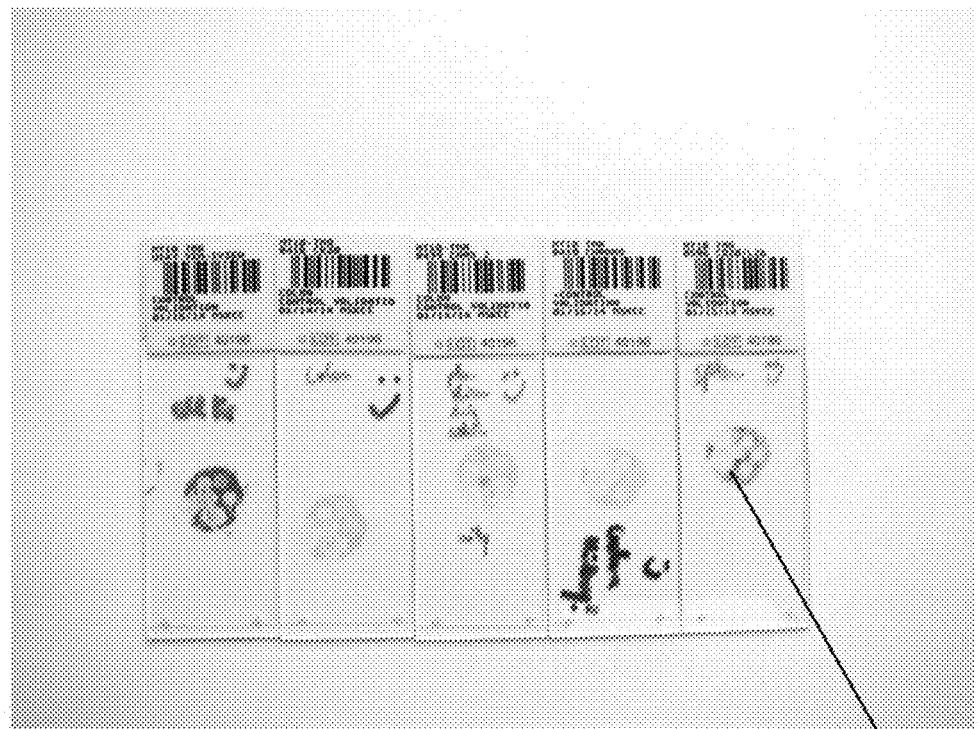
Figure 26
2605

Figure 27
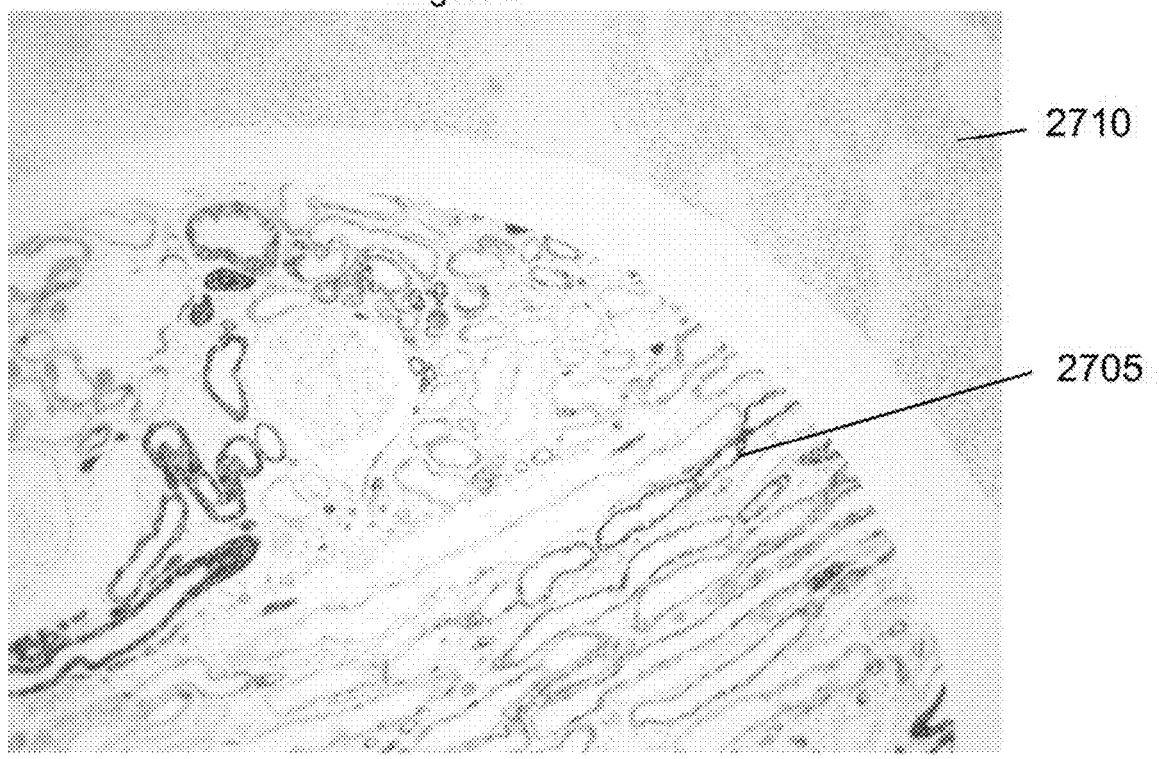
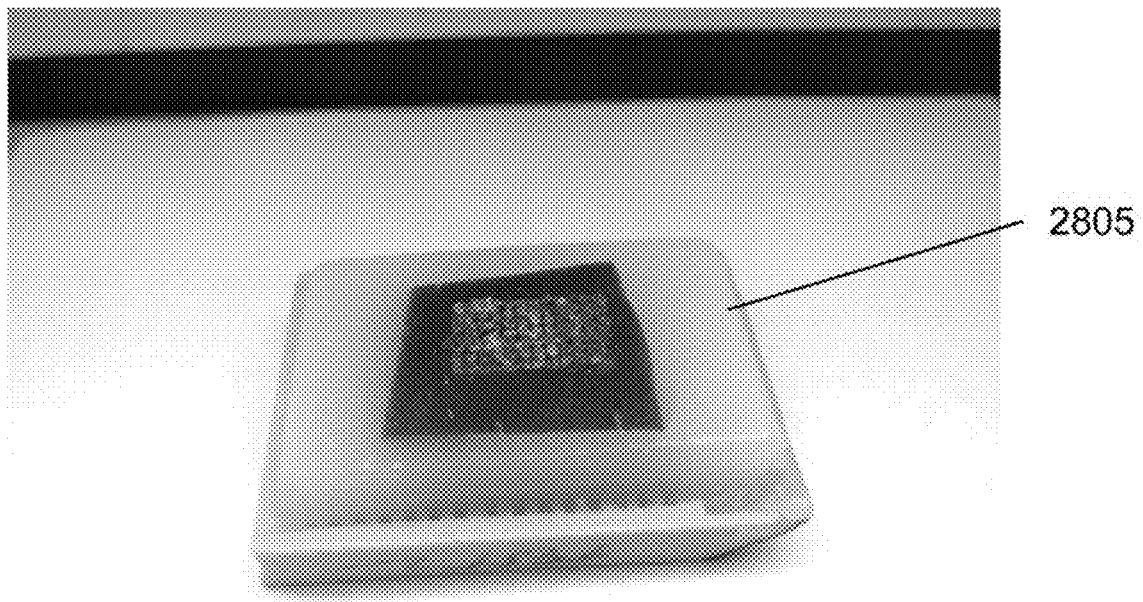
Figure 28

Figure 29
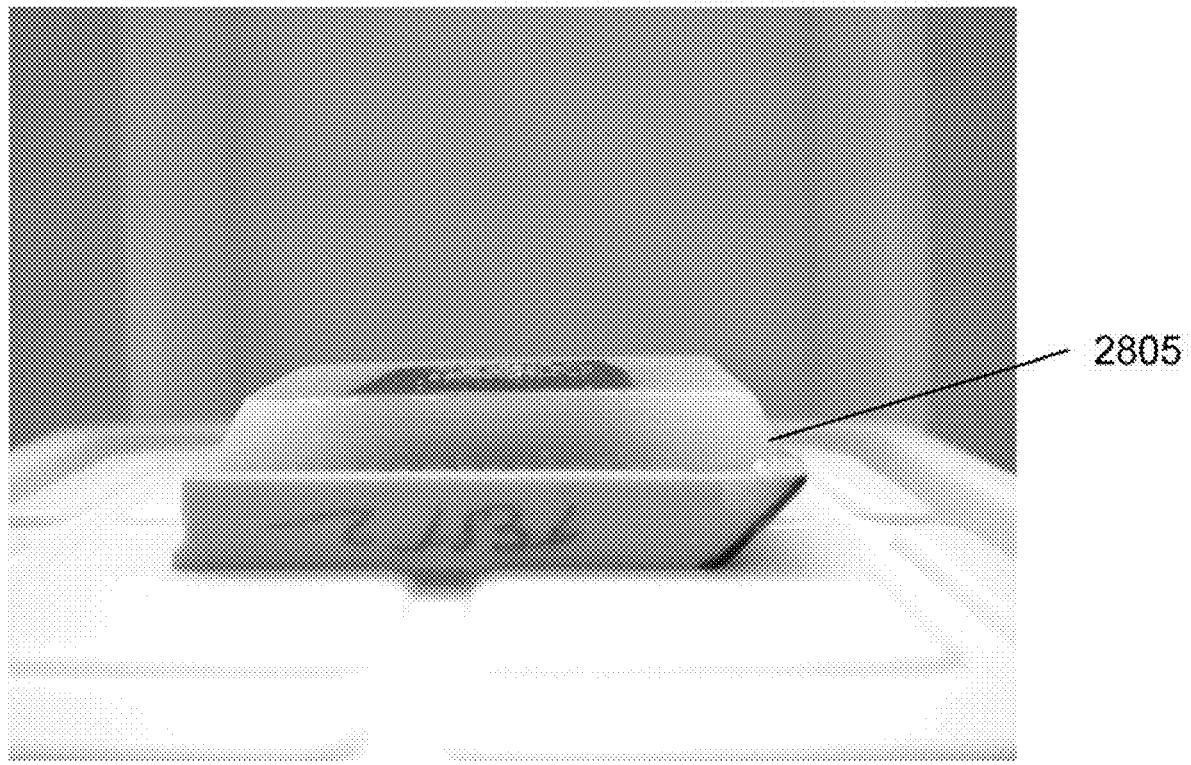
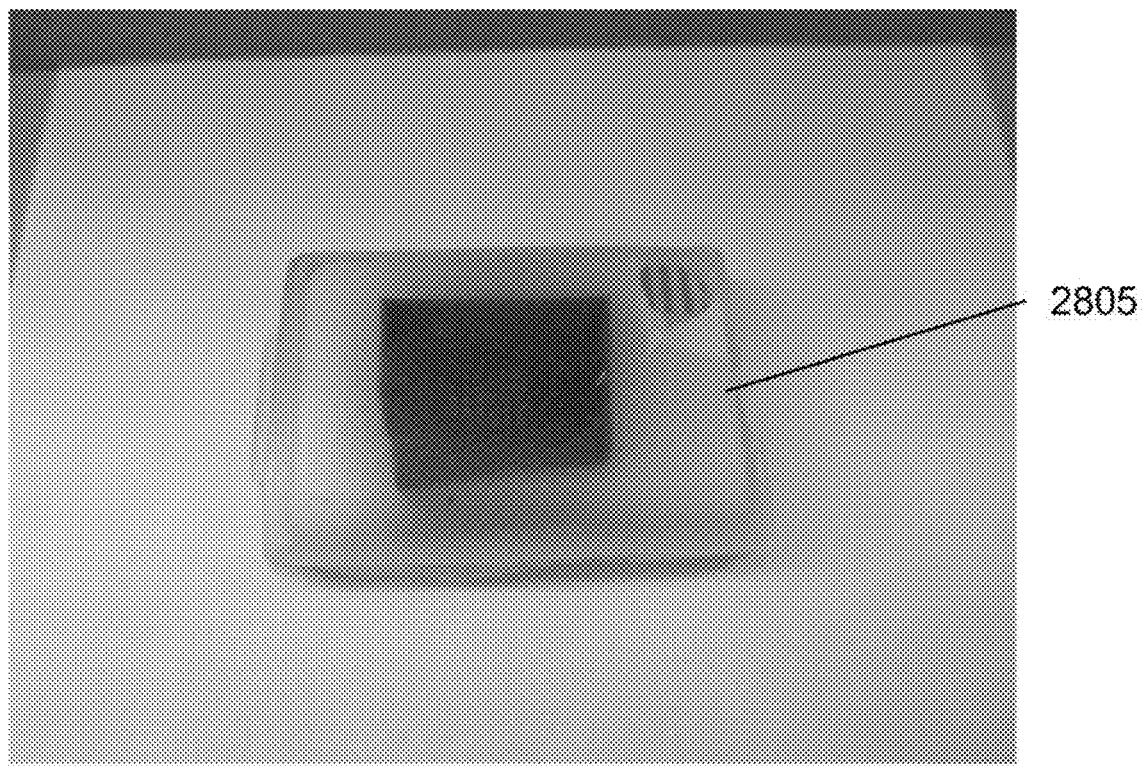
Figure 30

Figure 32
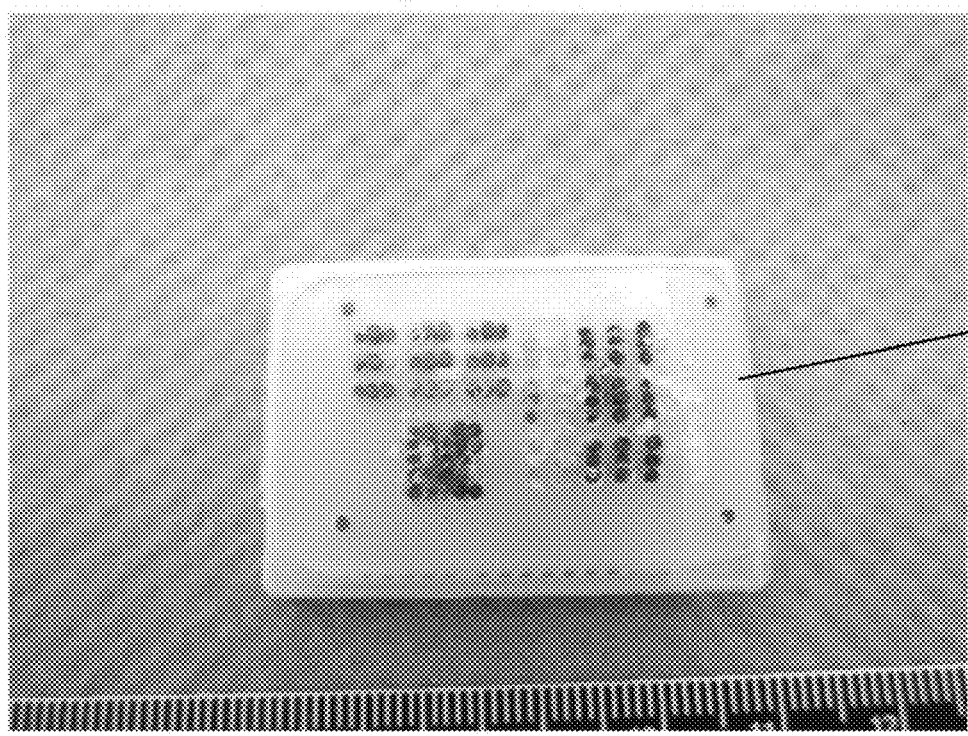
3205
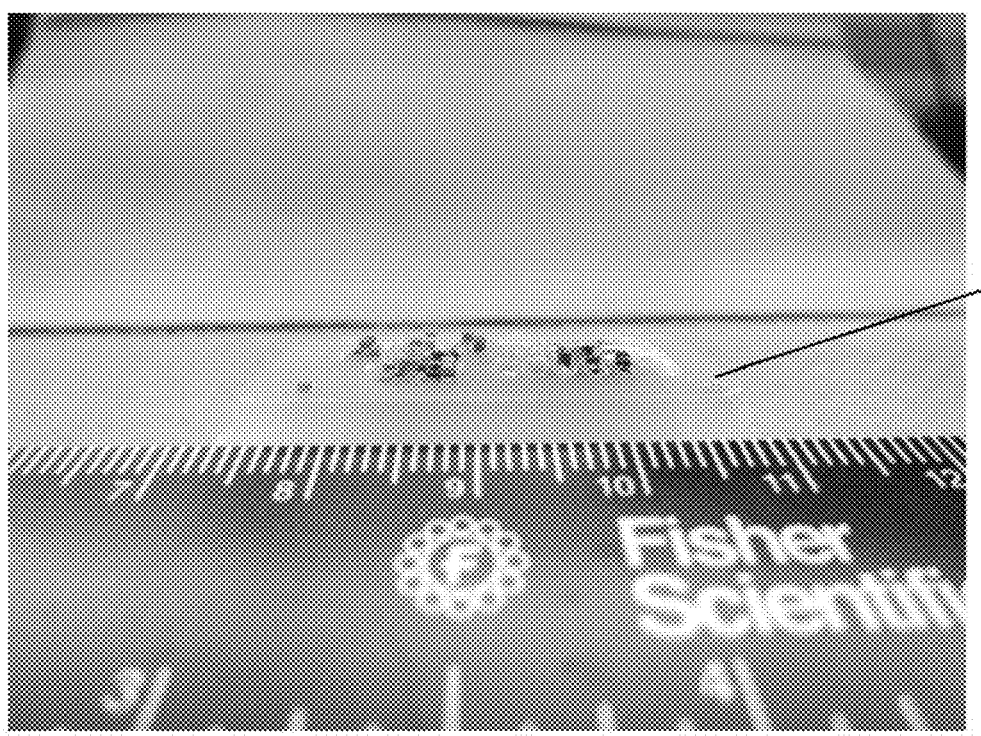
3305
Figure 33

TISSUE ARRAY USING A CARRIER MEDIUM AND METHOD FOR PROVIDING THE SAME

CROSS REFERENCE TO RELATED APPLICATIONS

This application relates to, and claims the benefit and priority from, International Patent Application No. PCT/US2015/044160 filed on Aug. 7, 2015, which relates to and claims priority from U.S. Provisional Patent Application No. 62/034,235, filed on Aug. 7, 2014, the entire disclosures of which are incorporated herein by reference.

FIELD OF THE DISCLOSURE

The present disclosure relates generally to tissue arrays, and more specifically, to exemplary embodiments of a tissue array having tissue used for structural support.

BACKGROUND INFORMATION

Microscopic analysis of tissue specimens can be the backbone of diagnostic surgical pathology, as well as being used in many research applications. Morphological analysis at the microscope can usually be performed by tissue sections being applied to microscopic slides. Tissue sections can be taken from tissue samples, which can be embedded in paraffin blocks. Paraffin embedding can be utilized in order to enable tissue sectioning for further analyses. Typically, paraffin blocks contain a single tissue specimen from a particular area, organ or tumor. Instead of having a single tissue or tumor embedded in a single paraffin block, it can be useful to have several different types of tissues embedded within the same block. This can ensure the proper choice of tissue, and can also reduce the number of sections to be taken, which would otherwise need to be taken from separate blocks.

Multi-tissue approaches can be important for analysis of new reagents, which need to be tested on several different types of tissue, as well as for the expression analysis of a particular antigen in various types of tissues or tumors. Paraffin blocks containing various tissues are often referred to as multi-tissue blocks or arrays, or as tissue microarrays ("TMAs") when the size of the single tissue components is not bigger than a few millimeters. For a typical multi-tissue block, samples from different types of tumors are usually re-embedded in paraffin, and assembled into a new (e.g., multi-tissue) block. This can be done by taking already embedded paraffin tissue from blocks which serve as "donor" blocks, and by cutting out the to-be-sampled tumor/tissue areas with a scalpel or a dermatological circular punch device. The excised areas can be placed in a histological mold, and then re-embedded in paraffin. This can be done by taking the single paraffin tissue piece into a new embedding mold, which can then be heated up so that the paraffin melts and the tissues can be arranged in a way to ensure their proper orientation within the block. This can be important because a correct orientation, especially at the horizontal level, can be needed so that all tissue can be equally cut during the sectioning procedure.

However, a problem when creating a multi-tissue block can be providing a correct orientation of all the tissues and the correct placement in one level (e.g., an even surface). This can be important since all tissue pieces should be in one level so that the sectioning of the block can result in sections including all tissues and tissue pieces represented in a particular multi-tissue block.

Conventional multi tissue blocks generally consist of few tissues which are placed in a mold, heated to melt the paraffin and manually arranged into the desired position. The number and size of tissues in a multi-tissue block can be limited by the required minimum size of the assembled tissues. Additionally, the number of tissue samples can be limited because it can be more difficult to differentiate between different samples if there are too many samples in a small area that are not properly aligned and/or oriented. Further, the needed size of a multi-tissue block can be limited due to its use as a control tissue when placed next to other tissues onto the same slide. Multi-tissue blocks can be arranged in plain paraffin blocks as accepter media. By using circular punch devices, the size of the sample tissue can be reduced to small tissue cylinders. However, the diameter can be limited by the need to keep them in an upright position during the re-embedding process.

Though smaller tissue samples can increase the number of sampled tissues, the small size can make it difficult to keep them in an upright position, which can be needed for proper sectioning of all tissues in a multi-tissue block. The same problem can also be present in TMAs, where the tissue samples can usually be cylindrical punches of less than about 1 mm in diameter. These punches can be placed in a plain paraffin block with punches of roughly the same size. The tissue punches have to remain in a vertical/upright position to ensure the proper presentation during sectioning of the block (e.g., during the removal of thin slices for examination). Due to the small diameter of the punches, and because they are placed in a paraffin block, the paraffin block with the tissue generally cannot be heated to ensure the proper embedding and polymerization of the paraffin. A plain paraffin microarray can only be slightly warmed such that the micro punches sticking out from the surface can be smoothly brought into one level by gently pushing them down and onto the level of the surrounding paraffin surface. If a plain paraffin microarray were heated to too high a temperature, the small-diameter tissue cores embedded therein cannot remain in a vertical position, and can become out of alignment in a horizontal position.

Prior methods of multi-tissue samples generally did not use a donor medium, except a paraffin-block only medium, which can be utilized for the embedding process. However, a plain paraffin block does not ensure the proper location and orientation of the tissues within a multi-tissue block. This can be done manually, and can be especially tedious and unsafe when the correct position of particular samples can be necessary.

Thus, it may be beneficial to provide an exemplary tissue arrangement, and method for making a tissue arrangement, that can easily maintain all of the tissue on the same level, and which can overcome at least some of the deficiencies described herein above.

SUMMARY OF EXEMPLARY EMBODIMENTS

An exemplary tissue array and a method for producing the same can be provided which can include, for example, providing an accepter block(s) having an accepter(s) tissue embedded therein, providing a donor block(s) having a donor tissue embedded therein, and removing a portion of the donor block(s) including a portion of the donor tissue(s). A portion of the accepter block(s) can be removed including a portion of the accepter tissue(s). The removed portion of the accepter block(s) can have a size that can be substantially similar to a size of the removed portion of the donor block(s). The removed portion of the donor block(s) can be inserted into the accepter block(s) at a location substantially corresponding to the removed portion of the accepter block(s).

In some exemplary embodiments of the present disclosure, the providing of the accepter block(s) can include inserting the accepter tissue into the accepter block(s), and heating the accepter block(s) to embed the accepter tissue into the accepter block(s). For example, the accepter biological structure(s) can be heated in a mold. The biological structure(s) can be pushed or compressed to the bottom of the mold in order to form a substantially flat surface thereon. The accepter biological structure(s) can be a single accepter biological structure and the removed portion(s) can include a plurality of removed portions. The donor tissue(s) can include a plurality of different donor tissues. In some exemplary embodiments of the present disclosure, the accepter biological structure(s) can include liver tissue, spleen tissue or any other tissue (e.g., any other homogeneous tissue).

The accepter block(s) can be heated after the removed portion of the donor block(s) can be inserted into the accepter block(s). The accepter block(s) can include paraffin. The removed portion of the donor block(s) and the removed portion of the accepter block(s) can be removed by a punch tool or a similar device, which can be shaped as a circle, a square, a rectangle, a triangle or any other shape In another exemplary embodiment of the present disclosure, an exemplary tissue microarray can be provided, which can include an accepter block(s) which can include an accepter tissue and a donor tissue that can be substantially surrounded by, and substantially structurally supported by, the accepter tissue. In another exemplary embodiment of the present disclosure, an exemplary tissue array and a method for producing the same can be provided, in which accepter biological structure(s) and a donor tissue(s) can be provided, and portion(s) of the donor tissue(s) and portion(s) of the accepter biological structure(s) can be removed. The removed portion(s) of the accepter biological structure(s) can have a size that can be substantially similar to a size of the removed portion(s) of the donor tissue(s). The removed portion(s) of the donor tissue(s) can be inserted into the accepter biological structure(s) at a location substantially corresponding to the removed portion(s) of the accepter biological structure(s). The tissue arrangement can be a tissue microarray, which can include over 100 donor tissues. The accepter tissue(s) can include liver tissue, spleen tissue or any other tissue.

The biological structure(s) can be provided by inserting an accepter tissue(s) into the accepter biological structure(s), and heating the accepter biological structure(s) block(s) to embed the accepter tissue(s) into the accepter biological structure(s). The accepter biological structure(s) can be heated after the removed portion(s) of the donor tissue(s) can be inserted into the accepter biological structure(s). The accepter biological structure(s) can include paraffin. The removed portion(s) of the donor tissue(s) and the removed portion(s) of the accepter biological structure(s) can be removed by a punch tool.

In another exemplary embodiment of the present disclosure, an exemplary tissue arrangement can be provided which can include, for example, an accepter biological structure(s) that can include an accepter tissue(s) and a donor tissue(s). The donor tissue(s) can be substantially surrounded by, and substantially structurally supported by, the accepter tissue(s).

In another exemplary embodiment of the present disclosure, an exemplary tissue slide arrangement can be provided, which can include a slide(s) that can include a tissue arrangement(s). The tissue arrangement(s) can include an accepter tissue(s) and a donor tissue(s). The donor tissue can be substantially surrounded by, and substantially structurally supported by, the accepter tissue(s). The slide(s) can include a further tissue arrangement(s). The tissue arrangement(s) can be used as a control and can be compared to the further tissue arrangement(s). In certain exemplary embodiments of the present disclosure, the slide(s) can include a plurality of slides, where each of the slides can include a different reagent In another exemplary embodiment of the present disclosure, an exemplary system and computer-accessible medium can be provided for creating a biological arrangement, in which, for example, an accepter biological structure(s) can be provided that can include an accepter tissue(s) surrounded by a support structure, a donor tissue(s) can be provided, and portion(s) of the donor tissue(s) can be removed. A boundary between the accepter tissue(s) and the support structure can be determined. Portion(s) of the accepter tissue(s) can be removed that can have a size that can be substantially similar to a size of the removed portion(s) of the donor tissue(s). The removed portion(s) of the donor tissue(s) can be inserted into the accepter tissue(s) at a location substantially corresponding to the removed portion(s) of the accepter tissue(s). The determining procedure can include differentiating between the accepter tissue(s) and the support structure such that only the accepter tissue(s) can be removed during the removal of the accepter tissue(s).

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIGS. 4-27 are exemplary images illustrating an exemplary procedure performed by a method for generating a tissue array according to an exemplary embodiment of the present disclosure;

FIGS. 28-31 are exemplary images of exemplary tissue micro arrays according to an exemplary embodiment of the present disclosure;

FIGS. 32-34 are exemplary images of conventional tissue micro arrays;

Figure 1:
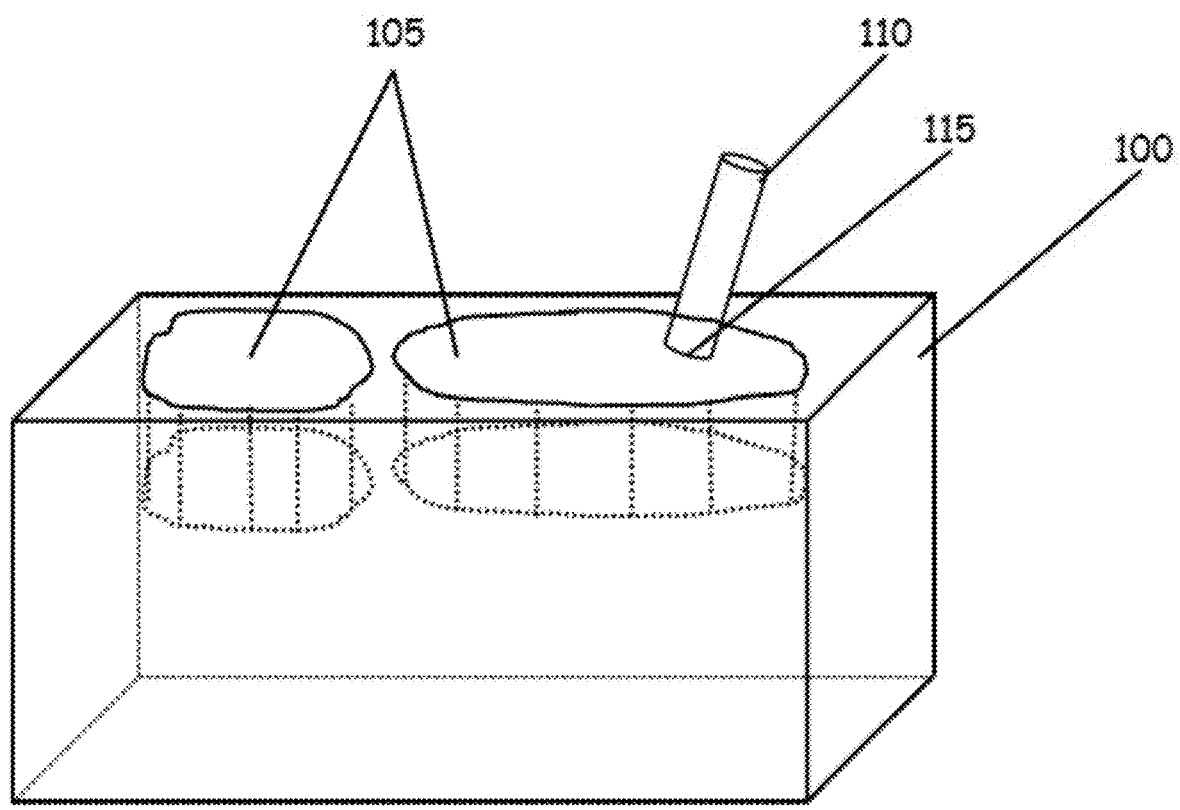
FIG. 1 is a perspective view of an exemplary accepter block according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures or the appended claims.

DETAILED DESCRIPTION OF EXEMPLARY EMBODIMENTS

Exemplary method and apparatus, according to an exemplary embodiment of the present disclosure, can provide and/or ensure that the orientation and proper placement of tissues for use, for example, in a tissue array or a TMA, can be secured when assembled into a multi tissue block. The exemplary method and apparatus can utilize various pieces or portions of accepter tissue (e.g., large or other sized pieces of tissue) that can be placed in a cassette. The exemplary accepter tissue can then be processed similar to normal tissue undergoing a standard paraffin embedding process resulting in a standard paraffin block. Alternatively, the accepter tissue and the donor tissue can be frozen in an ice block. Alternatively, the accepter tissue can be any other suitable medium which can serve as a support for the donor tissue.

As shown in FIG. 1, an accepter block 100 can include varying types of accepter tissue 105. While two separate accepter tissues 105 are shown in FIG. 1, any suitable number of accepter tissues can be incorporated into accepter block. For example, accepter block 100 can include 1 large accepter tissue 105.

Figure 2:
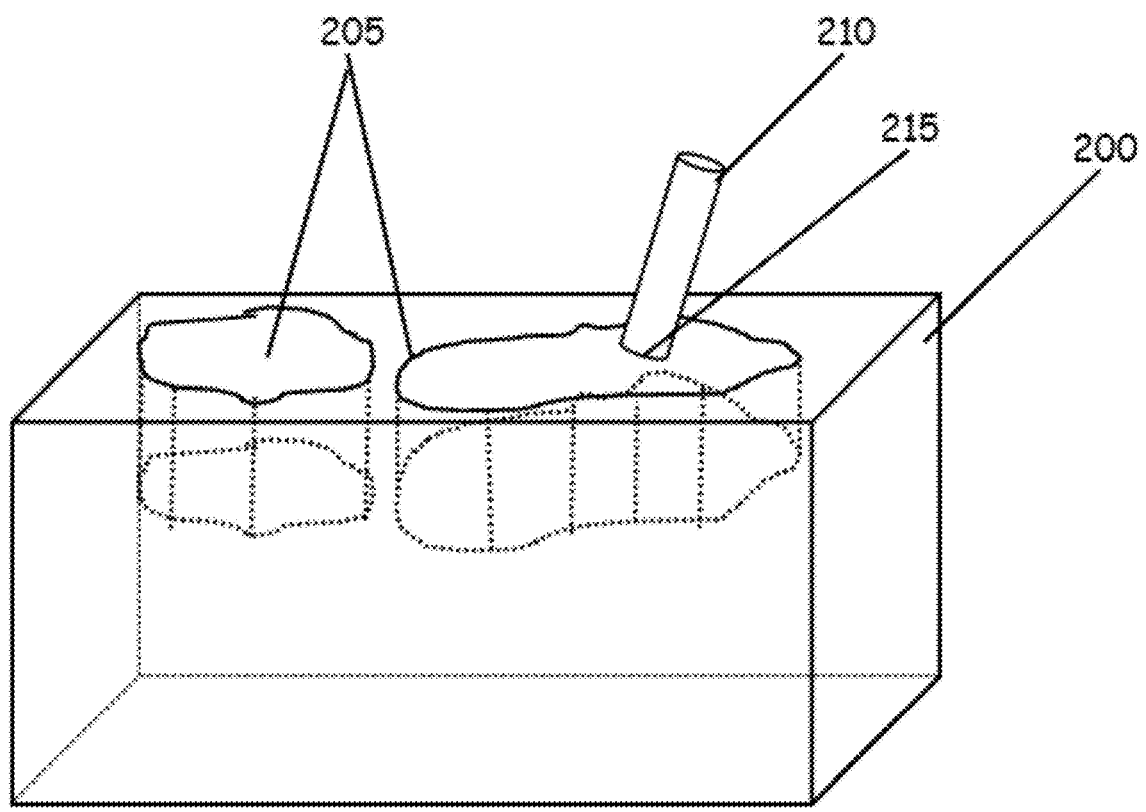
FIG. 2 is a perspective view of an exemplary donor block according to an exemplary embodiment of the present disclosure.

The exemplary accepter block 100 can then serve as an accepter for the other samples taken from one or more donor blocks. For example, as shown in FIG. 2, a donor block can include one or more donor tissues 205. While FIG. 2 illustrates two donor tissues embedded in donor block 200, donor block 200 can include a smaller amount of donor tissues (e.g., only one donor tissue), and/or donor block 200 can include more than two donor tissues. Additionally, more than one donor block 200 can include donor tissue 205 that can be used with a single accepter block 100.

The exemplary tissue array can be created or otherwise provided using the following exemplary method. For example, tissue 205 from donor block 200 can be removed from a desired area and with a desired size. For example, a portion 215 of donor tissue 205 can be removed through a hole 210 created in donor block 200. This can be performed, for example, with various dermatological punch devices, which can be, for example, circular knives in various diameters. Alternatively, exemplary punch devices shaped other than circular can be used (e.g., square, rectangle, triangle etc.). Punch devices of the same or similar size/diameter/shape can then be used to extract a similarly sized circular area 115 from a hole 110 in accepter block 100. The punched out area 115 from accepter block 100 can be discarded or used for other applications. The empty area within accepter block 100 can then be filled with the portion of tissue 215 of a similar size and shape taken from donor block 200. This procedure can be repeated with various different donor samples, and can be done with variably-sized donor tissue.

Figure 3:
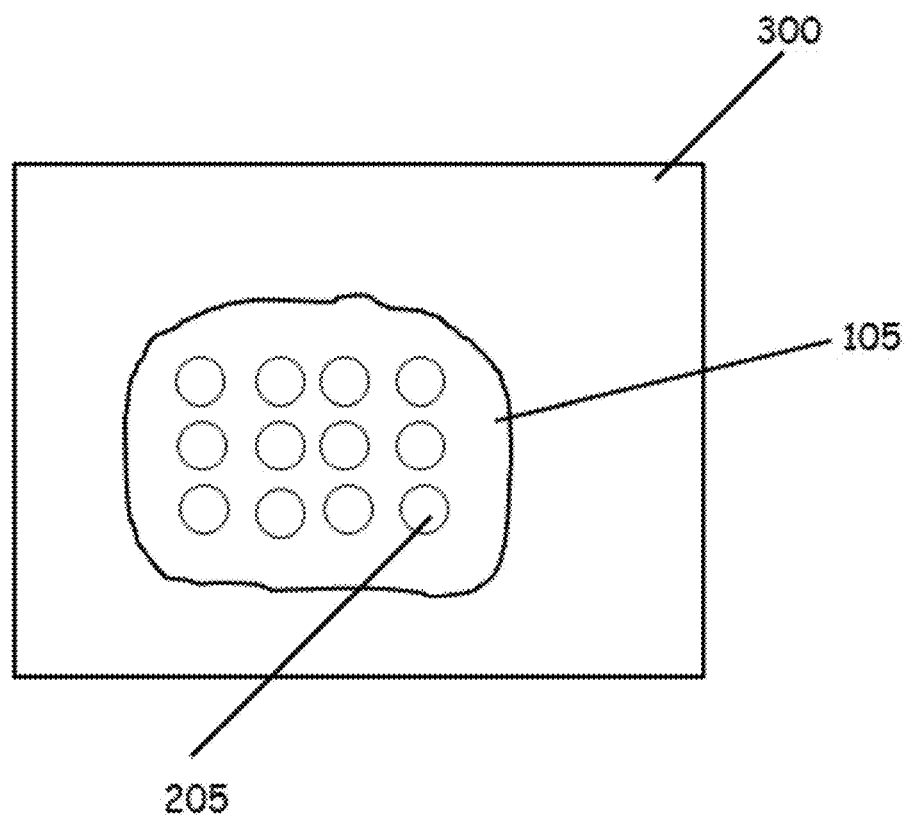
FIG. 3 is a top cross-sectional view of an exemplary accepter block containing accepter tissue and donor tissue according to an exemplary embodiment of the present disclosure.

When all donor samples are excised and placed into similar sized empty spaces in the accepter tissue, an accepter block with several circular samples is created. In an exemplary embodiment of the present disclosure, the exemplary donor punches can fit and match neatly in the pre-punched spaces of the accepter block. The accepter block formed from paraffin wax, accepter tissue, and donor tissue (e.g., accepter block 300 of FIG. 3), can be placed in a mold. The paraffin can be melted, and then the accepter block containing the donor tissue can be re-embedded. During the exemplary re-embedding procedure, the tissues can be automatically placed in one level, or can be provided in or on one level by gently pushing down on the tissue(s) from the top of the accepter block. Due to the size of the accepter spaces, and the size of the donor punches, the donor punches can move within their new location. However, the exemplary method and apparatus can automatically maintain and/or place the tissue in one level. Thus, the exemplary apparatus and method, according to an exemplary embodiment of the present disclosure, can prevent any tissue shift during the exemplary re-embedding process, and during the refilling of the mold with paraffin, which is a substantial problem in conventional tissue arrays. As the tissue can be easily placed and/or maintained in one level, the exemplary method and apparatus can facilitate even cutting of the exemplary block, and/or can prevent some or extensive amount of wasting and/or a destruction of the exemplary block.

In conventional tissue arrays, the tissue may not be easily maintained in one level, if at all. This can result in, for example, all of the various tissues sticking out of the block, and the tops of the various tissues being at different levels. Thus, to obtain a tissue sample containing all the tissues embedded in a prior art tissue block, various levels have to be removed until a block is achieved having all of the tissues on the same level. This can involve iteratively cutting and discarding the top layer until the desired top layer is achieved having all of the tissues on the same top level. Thus, conventional blocks can be very wasteful as a significant portion of the tissue has to be removed to achieve a block having all of the tissue on the same level. In contrast, the exemplary method and apparatus can easily put or maintain the tissues in one level during the exemplary re-embedding process, and little to no tissue is wasted. Prior art methods attempted to place the tissue on one level during the re-embedding process. However, such attempts were generally unsuccessful, and any attempted improvement in the maintaining of the tissues on the same level was tedious and time consuming.

The exemplary method and apparatus, according to an exemplary embodiment of the present disclosure, can also be used as an exemplary test or control tissue (e.g., a positive control or a negative control). For example, when testing and/or staining the tissue of a subject or person, it can be beneficial to ensure (a) that the correct reagent was used; (b) that the correct amount of reagent was used (e.g., no overstaining or understaining); and (c) that the reagent had not expired or lost is effectiveness. Without a control tissue, a person cannot tell if the reagent used is still viable, or if the correct amount of reagent was used. As the exemplary method and apparatus can place more tissue samples in a smaller space (e.g., 2, 3, 4, 5, 6, 7, etc. tissue samples in a small confined space), more tissue samples can be placed on a slide as a control, as less space can be needed. In contrast, conventional tissue arrays need a larger area for the same amount of tissue samples, and thus may not be suitable for use as control tissues.

The exemplary method and apparatus, according to an exemplary embodiment of the present disclosure, can utilize a mechanical device (e.g., manual or automated), which can sample punches of very small diameters (e.g., about 0.3 mm) to larger diameter punches (e.g., about 1 mm), although smaller and larger punch sizes can be utilized. These exemplary micro-punches can be taken from the donor tissues and placed into to an accepter paraffin block. Because of the size of the tissue donor punches, several hundred of array punches can be placed into an accepter block. As an accepter, a plain paraffin block can be used. As described herein, the exemplary method and apparatus can utilize the accepter block which can contain an already embedded piece of donor tissue. Instead of using a plain paraffin block without any tissue inside (e.g., prior art accepter blocks), the exemplary method and apparatus can utilize accepter tissue, which can serve as a scaffolding for the micro-tissue punches to surround and support the donor tissue. The accepter tissue can also act as a test tissue, and can include tissue obtained from the liver, spleen or similar homogeneous tissues, although other tissue types can be used. Additionally, mediums other than tissue can be used as an accepter medium including biological and non-biological mediums (e.g., gels containing organic matter such as collagen, and/or a mixture of organic matter and artificial material such as polymers and/or plastics).

Figure 4:
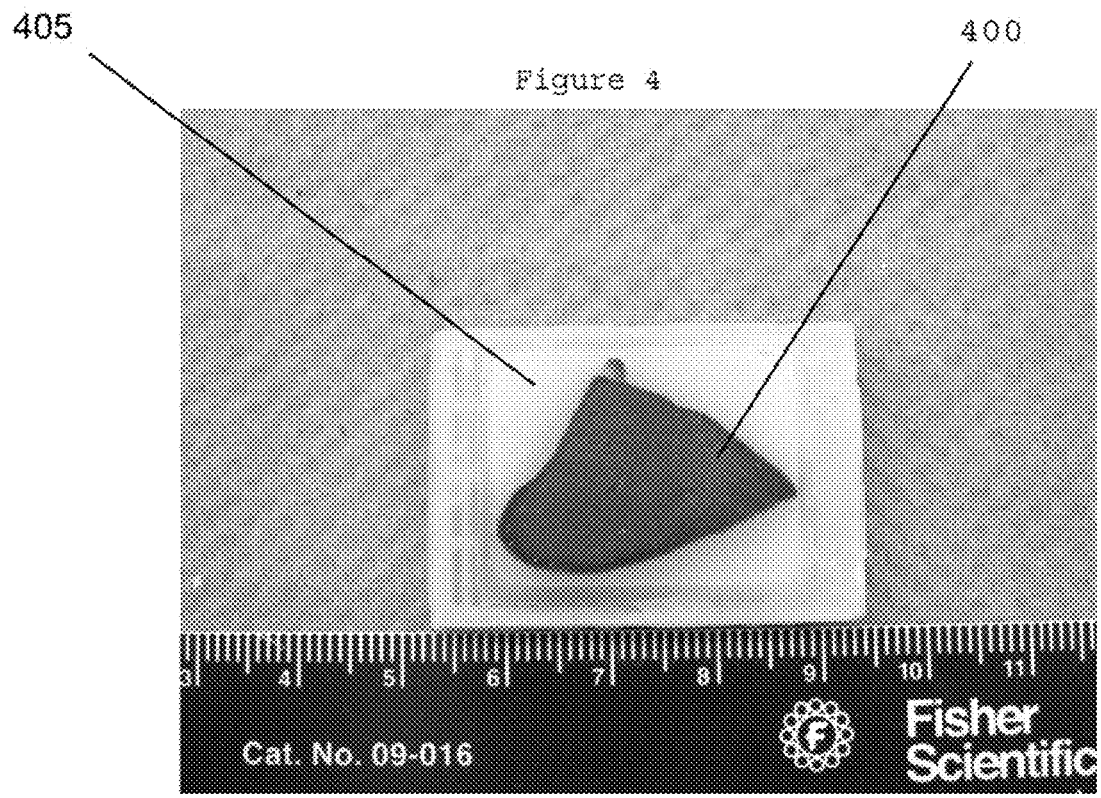
Figure 5:
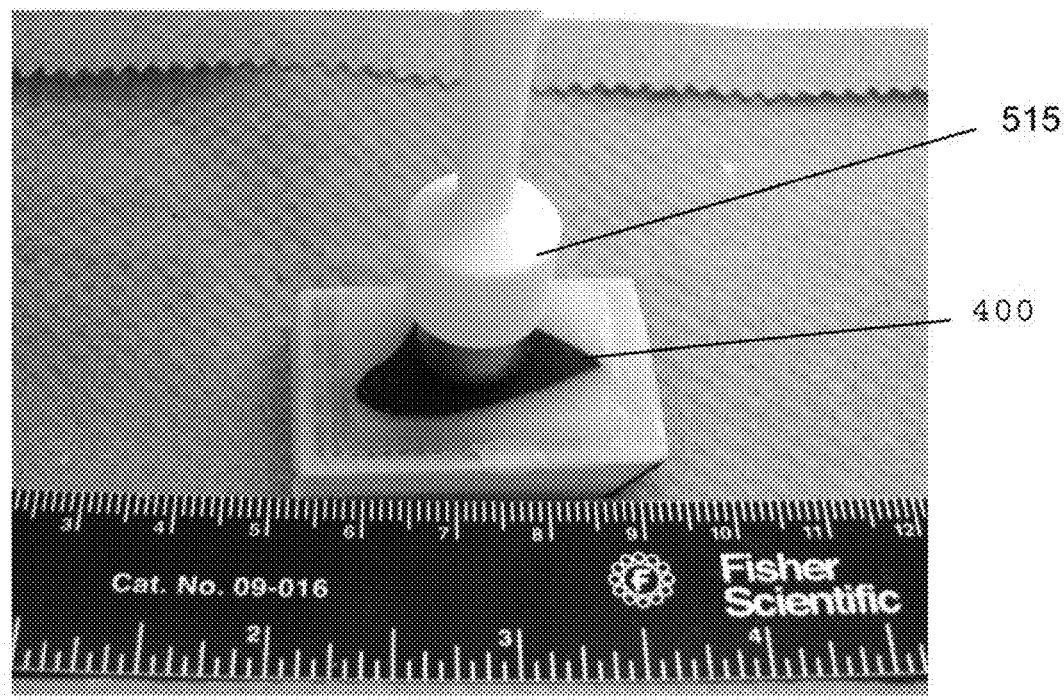
Figure 10:
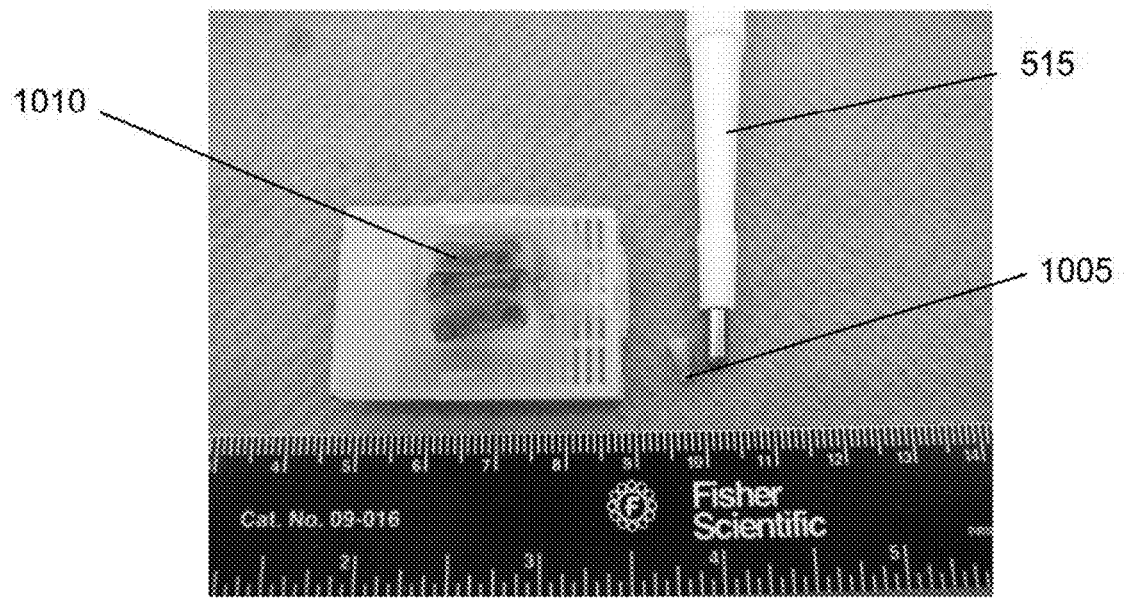
Figure 11:
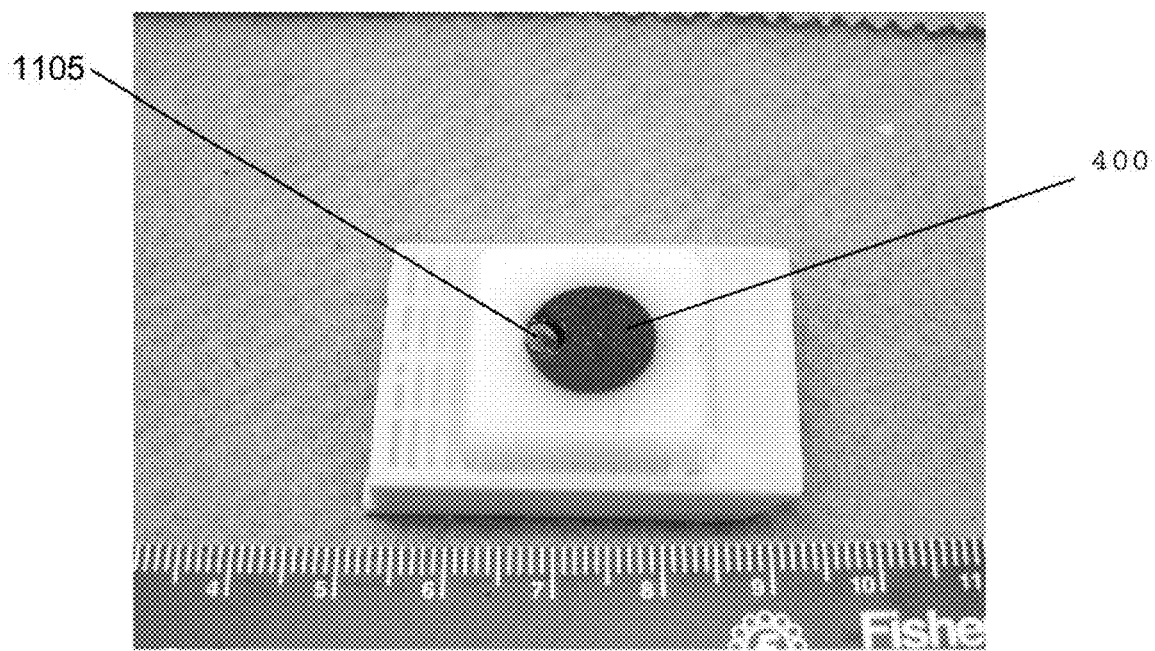
Figure 12:
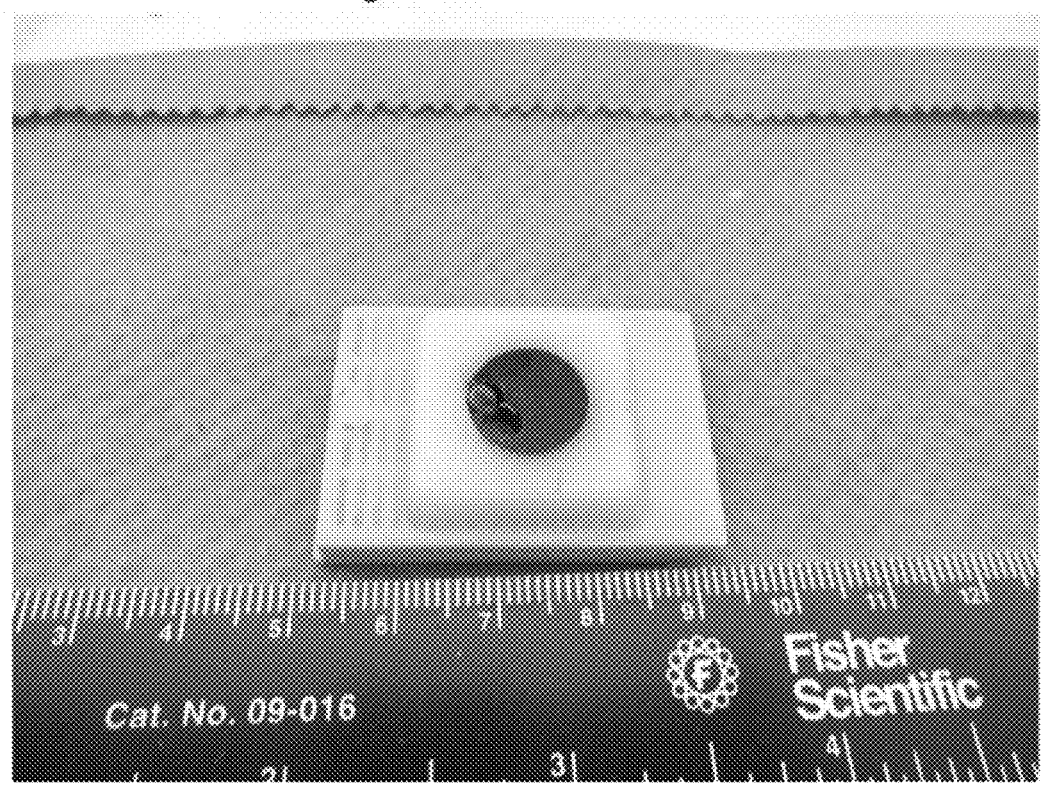
Figure 19:
Figure 20:
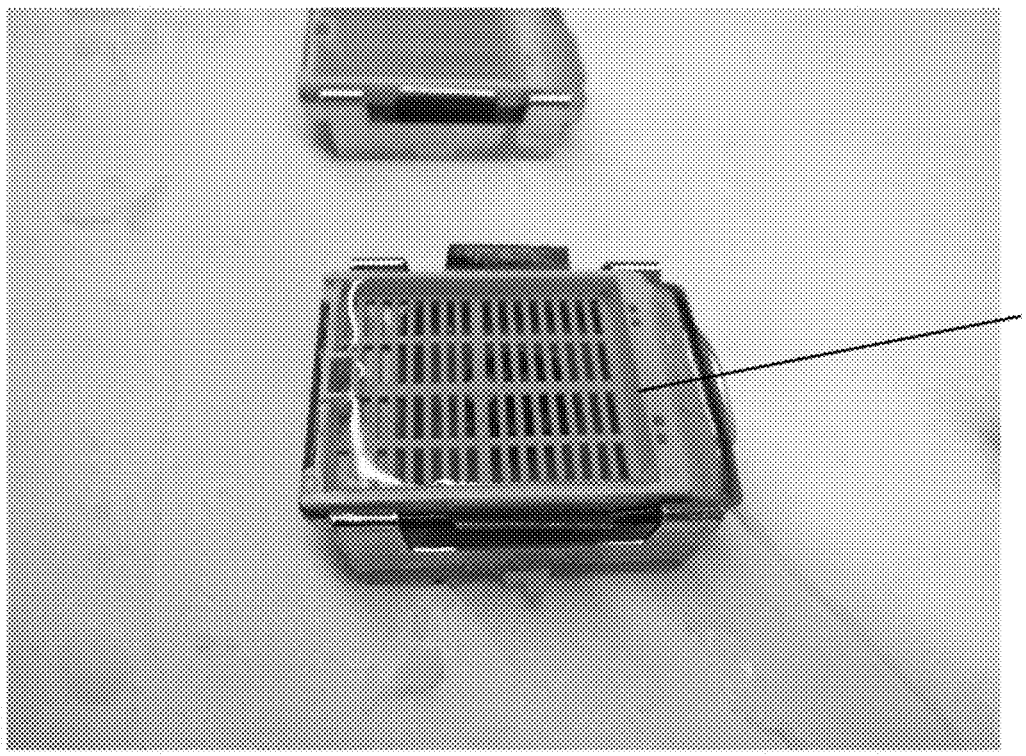
Figure 23:
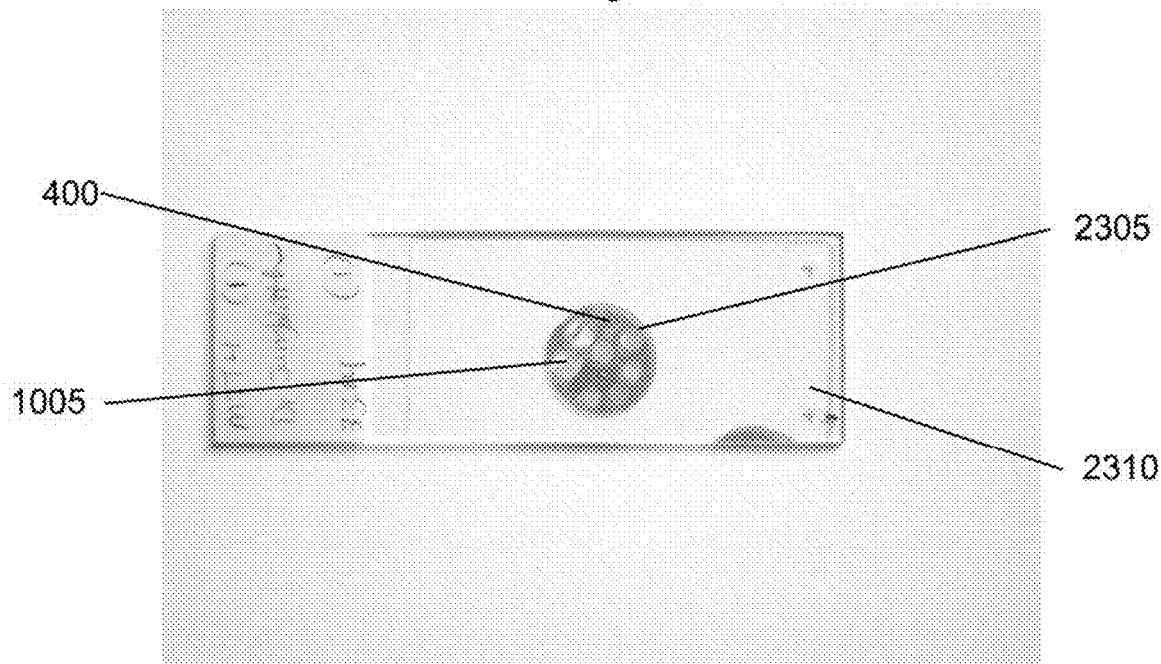
Figure 24:
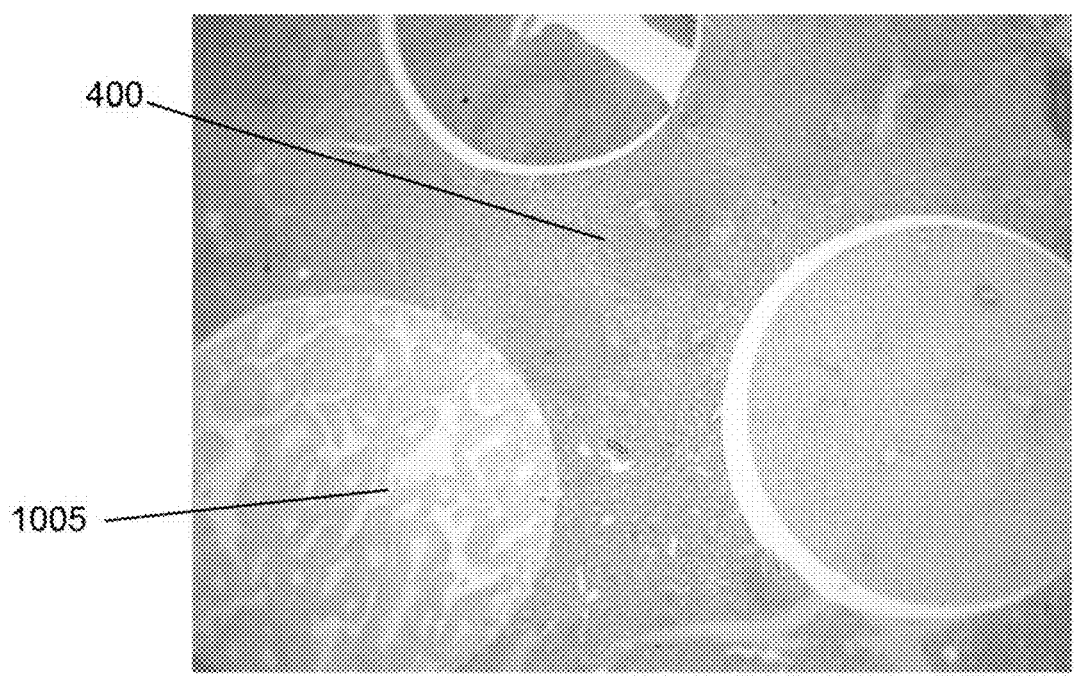
Figure 31:
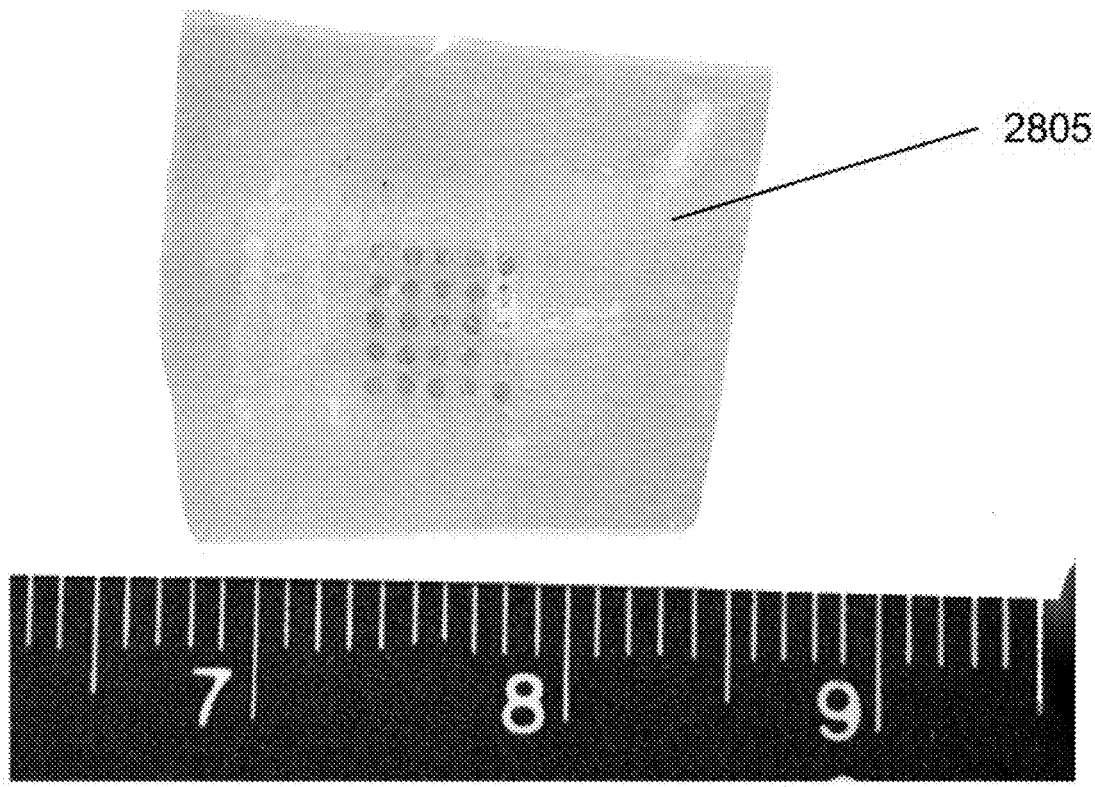

FIGS. 4-22 illustrate exemplary images of an exemplary sequence of various procedures of a method for generating a tissue array, according to an exemplary embodiment of the present disclosure. An exemplary generation of an exemplary multi tissue block ("MTB") can start with the generation of a recipient tissue 400 (see, e.g., FIGS. 4-9), which can be, for example, a 12 mm diameter spleen tissue core, or another tissue of a similar size. In this example, the recipient tissue is taken/made from a spleen archival paraffin block 405. (See e.g., FIG. 4). However, it should be noted that tissue from other organs or other biological or non-biological media can be used. To generate a recipient block, a circular-shaped, or other shaped, piece of tissue 610 can be removed with a dermatological punch device 515. (See e.g., FIGS. 5 and 9). The removed circular tissue 610 piece can be placed in a mold 720 (see e.g., FIG. 7), and can be heated and re-embedded. (See, e.g., FIG. 8). A tissue core can be punched out of the recipient block with a dermatological tissue biopsy punch device 515 or any other device (e.g., a 3 mm punch device). (See e.g., FIG. 9). A similar size piece of tissue 1005 (e.g., from a colon wall or other tissue) can be punched out of a donor block (see, e.g., FIG. 10 which illustrates a paraffin block 1010 with colon tissue and a punched out cylinder). The core from the donor block can then be inserted into the recipient block (e.g., into hole 1105). (See, e.g., FIG. 11). This process can be repeated for multiple tissue cores until the desired number of tissue samples is achieved. (See, e.g., FIGS. 12-16).

As shown in FIG. 16, when the desired number of tissue samples 1605 is placed in the recipient block 400, the recipient block 410 can have a very uneven surface 1610 because the donor cores 1005 and the surrounded recipient tissue 400 may not be on the same level. In order to place the tissue samples on the same level, the recipient block 400, including the donor tissues 410, can be placed face-down into a metal mold 1705 (See, e.g., FIG. 17). In order to prevent the inserted donor tissues from falling out, this can be achieved by placing the mold on top of the recipient block 400 and then flipping over the mold including the recipient block 400 so the recipient block 400 can be oriented face down. The mold 1705 and the tissue inside thereof can be heated so that the paraffin melts (See e.g., FIG. 18). When the paraffin is completely melted, the plastic cassette 1805 can be taken off, and the recipient block and the inserted tissue cores can be pushed down, so that their surfaces 1905 are all in level with the bottom of the mold. (See e.g., FIG. 19). The exemplary re-embedding process can be completed by placing the plastic cassette 1805 on top of the paraffin block, and the mold can be cooled to solidify the paraffin. (See e.g., FIGS. 20 and 21). The block can then be removed from the mold, and recipient tissue and donor cores can form one block 2200. (See e.g., FIG. 22).

FIGS. 23-27 show exemplary images of histological sections of an exemplary tissue array. For example, a histological section 2305 (e.g., placed on a slide 2310) can illustrate the recipient block 400 with the donor tissue cores 1005. (See, e.g., FIG. 23). (See, e.g., FIG. 24). A higher magnification can illustrate the tissue cores and the surrounding recipient tissue. The space between the tissue core and the recipient tissue can be filled with paraffin, and can pose no problem in the exemplary sectioning procedure. (See, e.g., FIGS. 24 and 25). Sections from these exemplary tissue blocks can be used for immunohistochemical analysis. For example, sections of the exemplary tissue blocks can be analyzed with, e.g., 5 different reagents 2605. (See, e.g., FIG. 26). A microscopic image (see, e.g., FIG. 27) illustrates the immunohistochemically stained donor tissue core 2705 and the surround recipient tissue 2710, which in this exemplary case can be negative.

While conventional tissue blocks can only be slightly warmed, the exemplary tissue block can be heated until the paraffin is completely melted, and the accepter tissue containing the micro-punches can be brought in one level, which can be, for example, the bottom of the mold. This can ensure the proper placement of all punches in the level of the tissue. Furthermore, for example, for appropriate and smooth cutting, the complete melting and solidifying of the paraffin can be beneficial. With the conventional method, cutting of tissue arrays can often be tedious and difficult. This can be because the small paraffin cylinders are placed into paraffin, and are only held in place by physical forces. This can cause problems during the sectioning process, as single punches can shift or be lost during the sectioning process. If the conventional plain paraffin tissue array block is heated, the donor micro punches (e.g., several hundred) can be in disarray and can tip over. By using an accepter tissue that can structurally hold the inserted micro-punches in place, the exemplary tissue array, according to an exemplary embodiment of the present disclosure, can be treated like a standard paraffin block without tissue, and can be heated so that the paraffin can be melted. Thus, fully melted paraffin can then be brought down in temperature, and can solidify to ensure the homogenous polymerization of all the paraffin within the exemplary tissue array block. This can make the sectioning process easier. Consequently, a higher yield of tissue sections can be gained by the exemplary method.

The exemplary method can also be used to produce one or more TMAs. Generally, the TMA can include hundreds of small tissue samples (e.g., 200-300 samples, although not limited thereto). Some conventional TMAs (e.g., TMAs 3205, 3305 of FIGS. 32 and 33) may not be heated because the size of each tissue sample is very small, and is subject to a lot of movement during a reheating process. For example, the tissue samples can fall over during the heating process. Additionally, as the samples are small, and each tissue sample may not be on the same level, there may only be a small number of layers left for use after the prior art tissue array block is sliced to achieve a block with all tissues on the same level. Additionally, the thickness of the inserted tissue can vary in length due to the variable thickness of the tissues in the donor blocks, which can result in different lengths of the inserted tissues in the accepter block. As a result of the variable lengths of the inserted tissues, due to the sectioning of the block to achieve histological sections, some tissue can be exhausted earlier and may not be represented, while other tissue can still be represented resulting incomplete TMA.

In contrast to conventional TMAs (e.g., TMAs 3205, 3305), the exemplary TMA 2805 (see, e.g., FIGS. 28-31) provided using the exemplary apparatus, according to an exemplary embodiment of the present disclosure, can be heated while maintaining the tissues in their position and on a single level. Thus, the exemplary TMA 2805 according to an exemplary embodiment of the present disclosure will not have the same problems as a traditional TMA. For example, once the exemplary TMA 2805 is heated, it can be pushed to put all of the tissue samples on one layer. Therefore, for example, the exemplary TMA 2805 has more available layers for slicing than a traditional TMA, as the first layer of the exemplary TMA 2805 can be used for slicing, whereas a conventional TMA has to be sliced many times before a uniform level for each tissue sample can be achieved.

Figure 34:
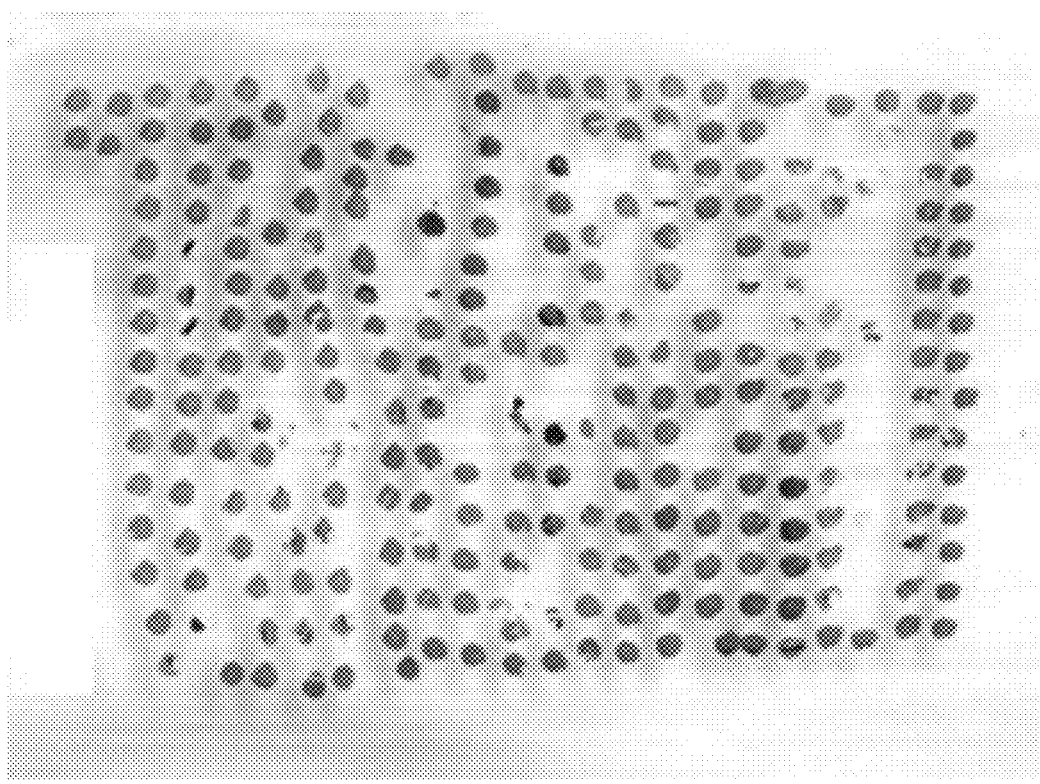

The sections of the exemplary tissue array can also be placed in a water bath without affecting the tissue samples embedded therein. For example, when a tissue array is sliced, the slice can be placed in a water bath. Tissue samples in the conventional tissue array can easily move or shift during this process. Once applied to a glass slide for histological analysis, the tissues can be or become missing and/or misaligned and deranged. (See e.g., FIG. 34). In contrast, the exemplary tissue array generated using the exemplary method, according to an exemplary embodiment of the present disclosure, can prevent the tissue samples from shifting, as the accepter tissue can provide structural support to maintain the location of the tissue samples embedded therein. (See e.g., FIG. 31).

An additional problem with the conventional TMAs can be that the inserted donor tissues can have different thicknesses. The use of the TMA can be limited by the thinnest inserted tissue. Once this tissue, or several tissues, with less thickness than the other tissues have reached the section level, the TMA can lack those tissues.

In contrast to the conventional TMAs, in the exemplary TMA, the tissue samples from a donor tissue, having only limited thickness left, can be punched several times, and stacked into a single punch hole of the accepter tissue of the exemplary TMA Thus, facilitating the use of thin donor tissues as several punches from the same thin donor tissue, which can now be placed on top of each other in a new TMA, rendering it sufficiently thick and creating a new TMA with a homogeneous thickness of all represented tissue. Therefore, the exemplary TMA, according to an exemplary embodiment of the present disclosure, can include several layers of donor tissue that can be placed on top of each other to increase the thickness of the donor tissue in the accepter block. This can facilitate a similar thickness of all donor tissue specimens. This can also increase the usability of the exemplary donor block since many more sections can be taken from the donor block while still displaying all the inserted donor tissues.

While the conventional tissue arrays and TMAs are manually arranged, the exemplary tissue array, according to the exemplary embodiments of the present disclosure, can be provided using, for example, an automated process, as the accepter tissue can provide a reference for the placement of the donor tissue. For example, after the accepter block has been created (e.g., using the exemplary procedure described above using a manual or automated process), the boundary of the accepter tissue and the donor tissue can be automatically determined, using, for example, an exemplary boundary determination procedure according to an exemplary embodiments of the present disclosure. When the boundary has been determined for the exemplary accepter tissue and the exemplary donor tissue, holes can be punched into to the accepter tissue using an exemplary hole punching procedure. Since an automated procedure can be more accurate, more samples can be placed in an accepter tissue through the exemplary automated procedure.

After the holes have been punched in the accepter tissue using the exemplary automated procedure of an exemplary embodiment of the present disclosure, tissue samples can be removed from one or more donor tissues and placed into the accepter tissue. The exemplary tissue array can then be heated to place all of the tissue samples on a single level (e.g., by compressing the tissue). Thus, while the exemplary tissue arrays can be created and/or provided using, for example, a manual procedure, the exemplary tissue arrays can also be created using an automated procedure, facilitating a quicker and cheaper process for creating tissue arrays.

Figure 35:
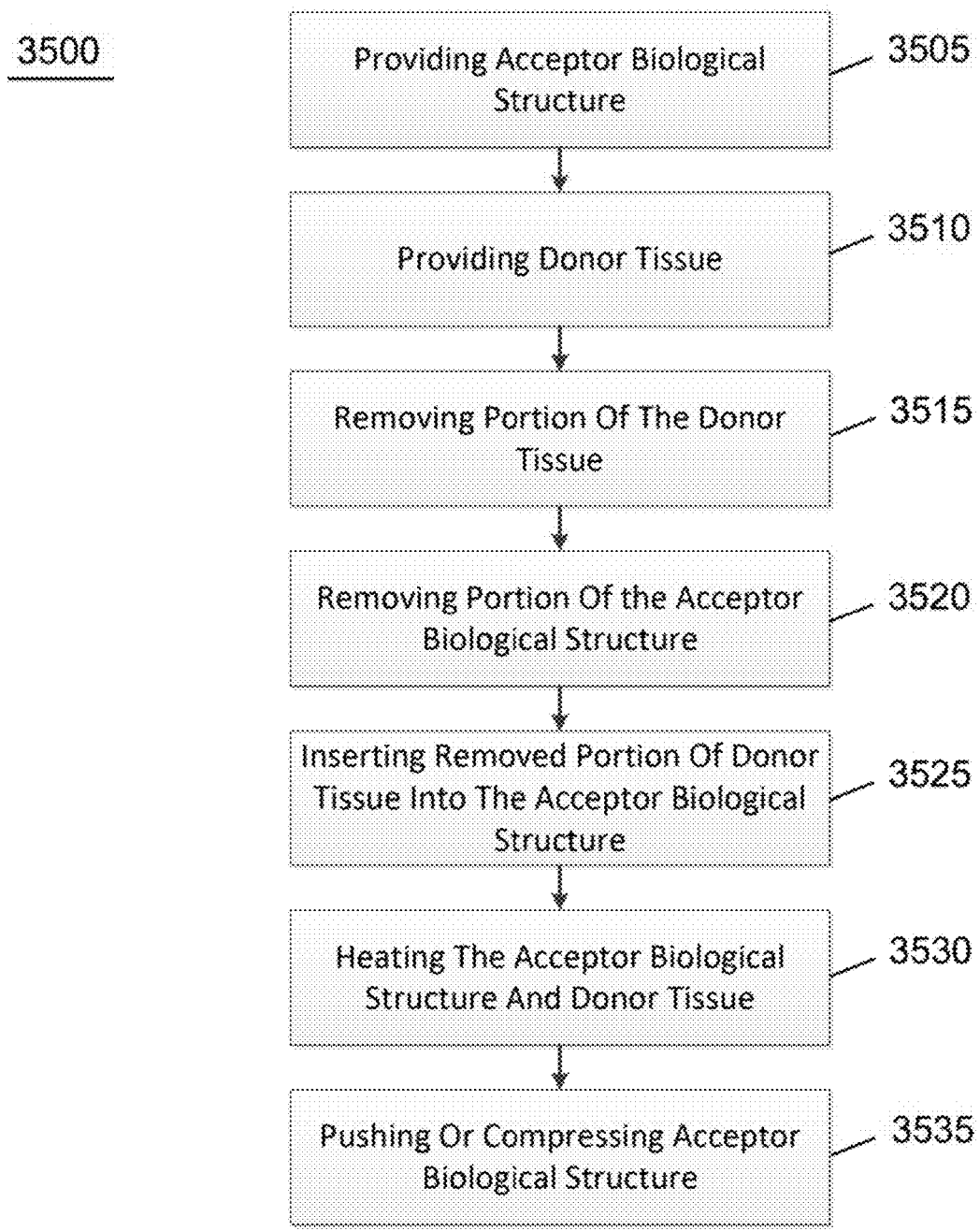
FIG. 35 is a flow diagram of an exemplary method for providing a biological arrangement according to an exemplary embodiment of the present disclosure.

FIG. 35 is an exemplary flow diagram of an exemplary method 3500 for providing a biological arrangement according to an exemplary embodiment of the present disclosure. For example, at procedure 3505, an accepter biological structure can be provided, and at procedure 3510, a donor tissue can be provided. A portion of the donor tissue can be removed at procedure 3515, and a portion of the accepter biological structure can be removed at procedure 3520. At procedure 3525, the removed portion of the donor tissue can be inserted into the accepter biological structure, and the combined donor tissue and accepter biological structure can be heated at procedure 3530. At procedure 3535, the accepter biological structure can be pushed or compressed to put such that there is an even surface thereon.

Figure 36:
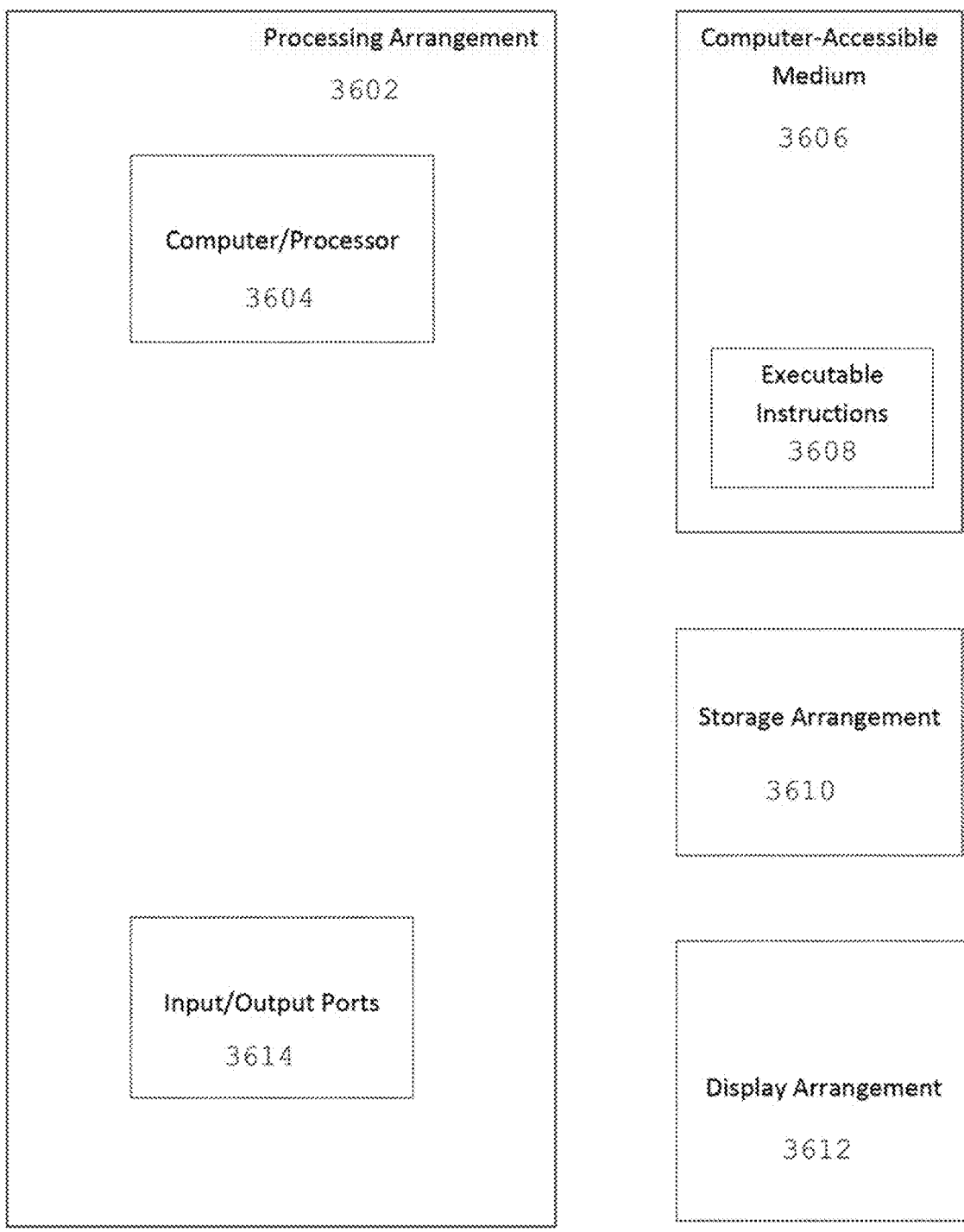
FIG. 36 is an illustration of an exemplary block diagram of an exemplary system in accordance with certain exemplary embodiments of the present disclosure.

FIG. 36 shows a block diagram of an exemplary embodiment of a system according to the present disclosure. For example, exemplary procedures in accordance with the present disclosure described herein can be performed by a processing arrangement and/or a computing arrangement 3602. Such processing/computing arrangement 3602 can be, for example entirely or a part of, or include, but not limited to, a computer/processor 3604 that can include, for example one or more microprocessors, and use instructions stored on a computer-accessible medium (e.g., RAM, ROM, hard drive, or other storage device).

As shown in FIG. 36, for example a computer-accessible medium 3606 (e.g., as described herein above, a storage device such as a hard disk, floppy disk, memory stick, CD-ROM, RAM, ROM, etc., or a collection thereof) can be provided (e.g., in communication with the processing arrangement 3602). The computer-accessible medium 3606 can contain executable instructions 3608 thereon. In addition or alternatively, a storage arrangement 3610 can be provided separately from the computer-accessible medium 3606, which can provide the instructions to the processing arrangement 3602 so as to configure the processing arrangement to execute certain exemplary procedures, processes and methods, as described herein above, for example.

Further, the exemplary processing arrangement 3602 can be provided with or include an input/output arrangement 3614, which can include, for example a wired network, a wireless network, the internet, an intranet, a data collection probe, a sensor, etc. As shown in FIG. 36, the exemplary processing arrangement 3602 can be in communication with an exemplary display arrangement 3612, which, according to certain exemplary embodiments of the present disclosure, can be a touch-screen configured for inputting information to the processing arrangement in addition to outputting information from the processing arrangement, for example. Further, the exemplary display 3612 and/or a storage arrangement 3610 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

What is claimed is:

1. A method for providing a biological arrangement, comprising:
    (a) providing, ex vivo, at least one acceptor biological structure;
    (b) providing at least one donor tissue;
    (c) removing at least one portion of the at least one donor tissue;
    (d) removing, ex vivo, at least one portion of the at least one acceptor biological structure, wherein the at least one removed portion of the at least one acceptor biological structure has a size that is similar to a size of the at least one removed portion of the at least one donor tissue;
    (e) inserting the at least one removed portion of the at least one donor tissue into the at least one acceptor biological structure at a location corresponding to the at least one removed portion of the at least one acceptor biological structure;
    (f) heating the at least one acceptor biological structure after the at least one removed portion of the at least one donor tissue is inserted into the at least one acceptor biological structure; and
    (g) at least one of pushing or compressing the at least one acceptor biological structure, while the at least one acceptor biological structure is heated, so as to form a flat surface thereon.

2. The method of claim 1, wherein the at least one acceptor biological structure can be provided by inserting at least one acceptor tissue into at least one biological structure, and heating the at least one biological structure to embed the at least one acceptor tissue into the at least one acceptor biological structure.

3. The method of claim 1, wherein the heating of the at least one acceptor biological structure after the at least one removed portion of the at least one donor tissue is inserted into the at least one acceptor biological structure includes heating the at least one acceptor biological structure in a cassette.

4. The method of claim 1, wherein the at least one acceptor biological structure is a single acceptor biological structure, and the at least one removed portion of the at least one donor tissue includes a plurality of removed portions of the at least one donor tissue.

5. The method of claim 4, wherein the at least one donor tissue includes a plurality of different donor tissues.

6. The method of claim 1, wherein the at least one acceptor biological structure includes at least one of (i) liver tissue, (ii) spleen tissue, or (iii) a homogeneous tissue.

7. The method of claim 1, wherein the at least one acceptor biological structure includes paraffin.

8. The method of claim 1, wherein the at least one removed portion of the at least one donor tissue and the at least one removed portion of the at least one acceptor biological structure is removed by a punch tool.

9. The method of claim 8, wherein the punch tool is shaped as at least one of (i) a circle, (ii) a square, (iii) a rectangle, or (iv) a triangle.

10. The method of claim 1, further comprising using a computer hardware arrangement, determining a boundary between the at least one acceptor tissue and a support structure prior to the ex vivo removing of the at least one portion of the at least one acceptor tissue.

11. The method of claim 10, further comprising, between procedures (e) and (f), placing a mold on a side of the at least one acceptor biological structure and inverting the at least one acceptor biological structure.

12. The method of claim 1, further comprising, between procedures (e) and (f), placing a mold on one side of the at least one acceptor biological structure, and inverting the at least one acceptor biological structure.

13. The method of claim 12, further comprising, prior to procedure (f), removing a cassette from the at least one acceptor biological structure after the at least one acceptor biological structure has been inverted.

14. The method of claim 12, wherein the substantially flat surface is level with the mold disposed on a further side of the at least one acceptor biological structure, and wherein the further side is opposite to the side with respect to the at least one acceptor biological structure.

15. The method of claim 1, wherein the flat surface is level with a mold disposed on a side of the at least me acceptor biological structure.

* * * * *